United States Patent
Whitesides et al.

(10) Patent No.: US 11,989,619 B2
(45) Date of Patent: May 21, 2024

(54) MODIFYING MESSAGES STORED IN MIXTURES OF MOLECULES USING THIN-LAYER CHROMATOGRAPHY

(71) Applicants: President and Fellows of Harvard College, Cambridge, MA (US); Northwestern University, Evanston, IL (US)

(72) Inventors: George M. Whitesides, Newton, MA (US); Albert Siangyoong Wong, Enschede (NL); Michael Johannes Fink, Cambridge, MA (US); Khaled Abdelazim Mohamed, Cambridge, MA (US); Alexei S. Ten, Evanston, IL (US); Milan M. Mrksich, Hinsdale, IL (US)

(73) Assignees: President and Fellows of Harvard College, Cambridge, MA (US); Northwestern University, Evanston, IL (US)

( * ) Notice: Subject to any disclaimer, the term of this patent is extended or adjusted under 35 U.S.C. 154(b) by 0 days.

(21) Appl. No.: 17/681,155

(22) Filed: Feb. 25, 2022

(65) Prior Publication Data
US 2022/0180083 A1 Jun. 9, 2022

Related U.S. Application Data

(63) Continuation of application No. PCT/US2020/048190, filed on Aug. 27, 2020.
(Continued)

(51) Int. Cl.
G06K 7/10 (2006.01)
B01J 19/00 (2006.01)
(Continued)

(52) U.S. Cl.
CPC ........ *G06K 7/1434* (2013.01); *B01J 19/0046* (2013.01); *G01N 30/90* (2013.01);
(Continued)

(58) Field of Classification Search
CPC .... B01J 2219/00637; B01J 2219/00626; B01J 2219/00617; G01N 30/90; G01N 33/5076;
(Continued)

(56) References Cited

U.S. PATENT DOCUMENTS 5,453,970 A 9/1995 Rust et al.
6,589,726 B1 * 7/2003 Butler ..................... C03C 17/30
506/40

(Continued)

FOREIGN PATENT DOCUMENTS

WO WO-1997/007440 A1 2/1997
WO WO-2007/128804 A2 11/2007
(Continued)

OTHER PUBLICATIONS

Arcadia et al., "Parallelized Linear Classification with Volumetric Chemical Perceptrons," Brown University, 1-9 (2018).
(Continued)

*Primary Examiner* — Daniel St Cyr
(74) *Attorney, Agent, or Firm* — Alexander Akhiezer; Erik A. Huestis; Foley Hoag LLP

(57) ABSTRACT

Storage media are provided. A substrate has an array of addressable locations thereon, each addressable location adapted to be physically associated with a collection of molecules, each collection comprising at least a first subcollection of molecules and a second subcollection of molecules. The molecules in the collection are selected from a set of unambiguously identifiable molecules, the set comprising at least a first subset of molecules and a second
(Continued)

subset of molecules. Each molecule in the first subset is identifiable by a first physical property, and each molecule in the second subset is identifiable by a second physical property, different from the first physical property. Each molecule in the set is uniquely associated with a predetermined position in a numerical value, wherein the presence of the molecule in the collection indicates a predetermined digit at the associated position and the absence of said molecule in the collection indicates a zero at said associated position.

2 Claims, 31 Drawing Sheets

Related U.S. Application Data

(60) Provisional application No. 62/892,171, filed on Aug. 27, 2019.

(51) Int. Cl.
    *G01N 30/90*   (2006.01)
    *G06K 7/14*    (2006.01)
    *G06K 19/06*   (2006.01)

(52) U.S. Cl.
    CPC ............... *G06K 19/06037* (2013.01); *B01J 2219/00605* (2013.01); *B01J 2219/00659* (2013.01); *B01J 2219/00695* (2013.01); *B01J 2219/00725* (2013.01)

(58) Field of Classification Search
    CPC ............ G01N 35/00732; G06K 19/00; G06K 19/06103; G06K 19/06037
    USPC .................................. 235/462.01, 385, 380
    See application file for complete search history.

(56) References Cited

U.S. PATENT DOCUMENTS

| | | | |
|---|---|---|---|
| 7,470,518 | B2 | 12/2008 | Chiu et al. |
| 9,013,968 | B2 | 4/2015 | Monzar |
| 9,384,320 | B2 | 7/2016 | Church |
| 9,582,771 | B2 | 2/2017 | Perez-Mercader et al. |
| 9,928,869 | B2 | 3/2018 | Church |
| 10,650,312 | B2 | 5/2020 | Roquet et al. |
| 10,838,939 | B2 | 11/2020 | Walder et al. |
| 10,917,109 | B1 | 2/2021 | Dimopoulou et al. |
| 11,093,865 | B2 | 8/2021 | Rubenstein et al. |
| 11,106,633 | B2 | 8/2021 | Sagi et al. |
| 11,302,421 | B2 | 4/2022 | Yao et al. |
| 11,514,331 | B2 | 11/2022 | Bathe et al. |
| 11,535,842 | B2 | 12/2022 | Roquet et al. |
| 2004/0114491 | A1 | 6/2004 | Psaltis et al. |
| 2004/0185169 | A1* | 9/2004 | Peck ............... B01J 19/0046 506/9 |
| 2006/0110819 | A1* | 5/2006 | Lomas ............ G01N 33/54353 435/287.2 |
| 2006/0191319 | A1 | 8/2006 | Kurup |
| 2007/0072193 | A1* | 3/2007 | Shah .................. B01J 19/0046 435/7.1 |
| 2014/0200716 | A1 | 7/2014 | Perez-Mercader et al. |
| 2018/0121478 | A1 | 5/2018 | Walder et al. |
| 2018/0137418 | A1 | 5/2018 | Roquet et al. |
| 2019/0072493 | A1 | 3/2019 | Wang et al. |
| 2019/0121936 | A1 | 4/2019 | Church |
| 2019/0162714 | A1 | 5/2019 | Karimi |
| 2021/0217474 | A1 | 7/2021 | Whitesides et al. |
| 2022/0012646 | A1 | 1/2022 | Rubenstein et al. |
| 2022/0301624 | A1 | 9/2022 | Whitesides et al. |
| 2023/0027270 | A1 | 1/2023 | Rubenstein et al. |

FOREIGN PATENT DOCUMENTS

| | | |
|---|---|---|
| WO | WO-2014/014991 A2 | 1/2014 |
| WO | WO-2018/081566 A1 | 5/2018 |
| WO | WO-2018/094108 A1 | 5/2018 |
| WO | WO-2018/094115 A1 | 5/2018 |
| WO | WO-2019/246434 A1 | 12/2019 |
| WO | WO-2019/246434 A9 | 3/2020 |
| WO | WO-2020/112233 A2 | 6/2020 |
| WO | WO-2020/112233 A9 | 9/2020 |
| WO | WO-2021/041667 A1 | 3/2021 |
| WO | WO-2021/062220 A1 | 4/2021 |
| WO | WO-2022/069022 A1 | 4/2022 |

OTHER PUBLICATIONS

Banda et al., "Online learning in a chemical perceptron," Artificial Life, 19: 195-219 (2013).

Cafferty et al., "Storage of Information Using Small Organic Molecules," ACS Cent. Sci, 5:911-916 (2019).

Cafferty et al., "Storage of Information Using Small Organic Molecules," ASC Central Science, 5(5): 911-916 (2019).

Gurard-Levin et al., "Peptide Arrays Identify Isoform-Selective Substrates for Profiling Endogenous Lysine Deacetylase Activity," ACS Chemical Biology, 5(9):863-873 (2010).

Hjelmfelt et al., "Chemical implementation of neural networks and Turing machines," Proceedings of the National Academy of Sciences, 88: 10983-10987 (1991).

International Search Report and Written Opinion for International Application No. PCT/US2019/038301 dated Nov. 27, 2019.

International Search Report and Written Opinion for International Application No. PCT/US2019/053521 dated Jul. 28, 2020.

International Search Report and Written Opinion for International Application No. PCT/US2020/048190 dated Nov. 2, 2020.

International Search Report and Written Opinion for International Application No. PCT/US2020/052814 dated Jan. 19, 2021.

Kennedy et al., "Encoding information in synthetic metabolomes," PLoS One, 14(7): e0217364 (12 pages) (2019).

Kornacki et al., "Acetyltransferase p300/CBP Associated Factor (PCAF) Regulates Crosstalk-Dependent Acetylation of Histone H3 by Distal Site Recognition," ACS Chem. Biol., 10:157-164 (2015).

Martens et al., "Multifunctional sequence-defined macromolecules for chemical data storage," Nature Communications, 9(4451):1-8 (2018).

O'Kane et al., "An Assay Based on SAMDI Mass Spectrometry for Profiling Protein Interaction Domains," Journal of The American Chemical Society, 139:10320-10327 (2017).

Riepl et al., "Electrical Control of Alkanethiols Self-Assembly on a Gold Surface as an Approach for Preparation of Microelectrode Arrays," Mikrochimica Acta, 131(1): 29-34 (1999).

Rose et al., "Computing chemicals: Perceptions using mixtures of small molecules," 2018 IEEE International Symposium on Information Theory (ISIT), retrieved online <https://ieeexplore.ieee.org/abstract/document/8437814>: 2236-2240 (2018).

Rosenstein et al., "Principles of Information Storage in Small-Molecule Mixtures," Arxiv.org, Cornell University Library, 201 Olin Library Cornell University Ithaca, NY 14853 (2019).

Szymczak et al., "Peptide Arrays: Development and Application," Anal. Chem., 90:266-282 (2018).

Szymczak et al., "Using Peptide Arrays To Discover the Sequence-Specific Acetylation of the Histidine-Tyrosine Dyad," Biochemistry, 58:1810-1817 (2019).

Aksakal et al., "Applications of Discrete Synthetic Macromolecules in Life and Materials Science: Recent and Future Trends"Advanced Science, vol. 8, 22 pages (2021).

Arcadia et al. "Multicomponent molecular memory" Nature Communications, vol. 11, Issue 691: 8 pages (2020).

Arita et al., "DNA Memory" Handbook of Natural Computing, pp. 1281-1318 (2012).

Bohn et al., "Molecular data storage with zero synthetic effort and simple read-out" Scientific Reports, vol. 12, 8 pages (2022).

(56) References Cited

OTHER PUBLICATIONS

Boukis et al., "Multicomponent reactions provide key molecules for secret communication" Nature Communications, vol. 9, 9 pages (2018).
Niu et al., "Enzyme-Free Translation of DNA into Sequence-Defined Synthetic Polymers Structurally Unrelated to Nucleic Acids" Nat Chem, 5(4): 282-292 (2013).
Tabatabei., "Next Generation DNA-Based Data Recorders" University of Illinois Urbana-Champaign (2022).
Tsaftaris et al., "On Designing DNA Databases for the Storage and Retrieval of Digital Signals" LNCS, vol. 3611, pp. 1192-1201 (2005).
Yu et al., "Small-Molecule-Based Organic Field-Effect Transistor for Nonvolatile Memory and Artificial Synapse" Advanced Functional Materials, vol. 29, Issue 50 (2019).

\* cited by examiner

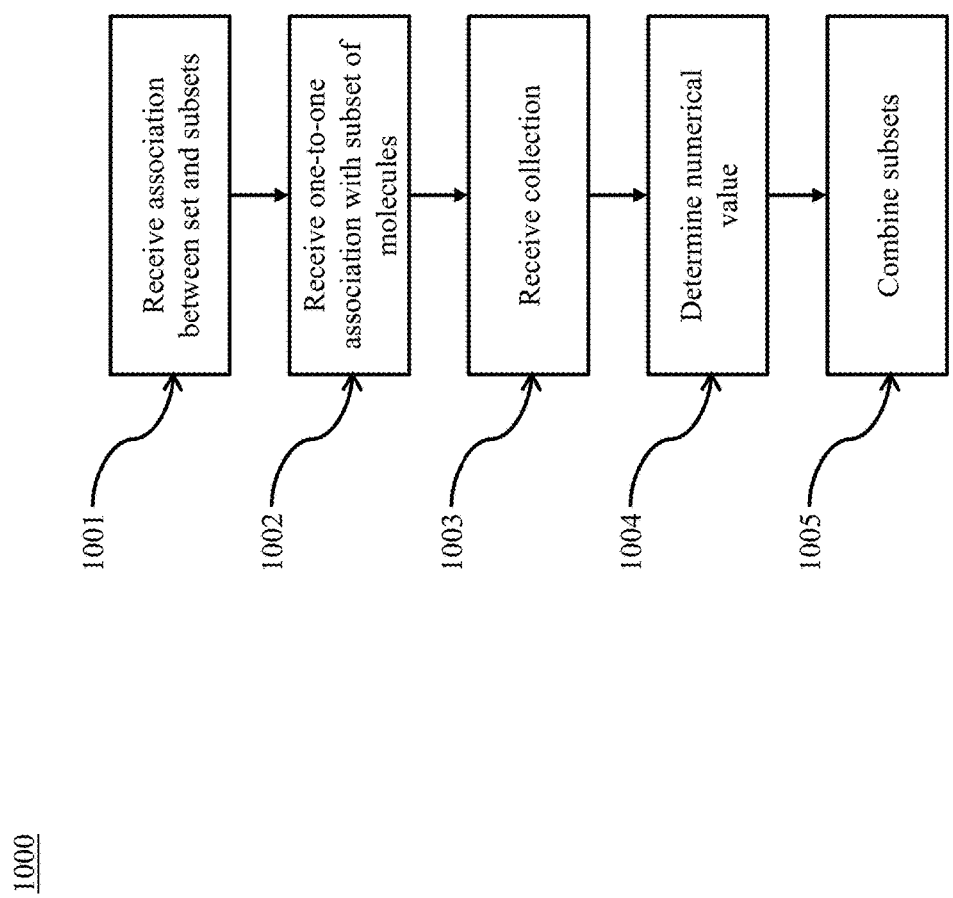

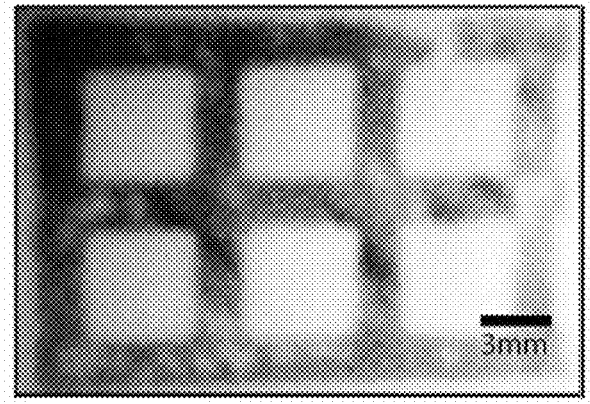
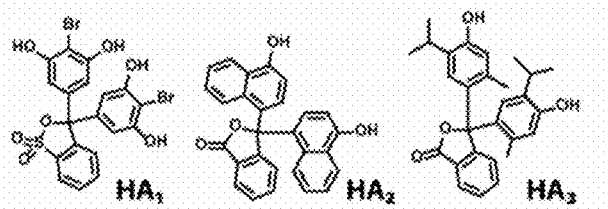
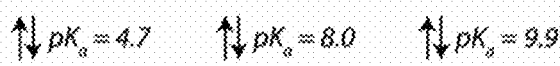
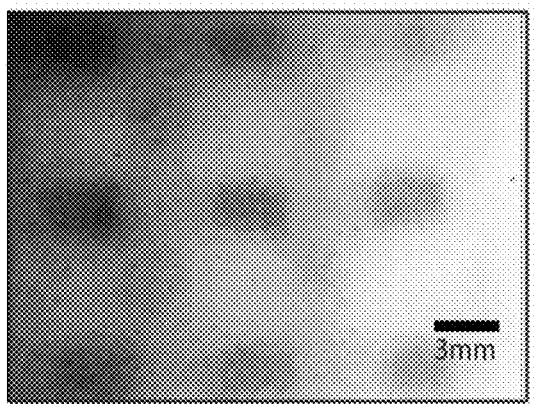
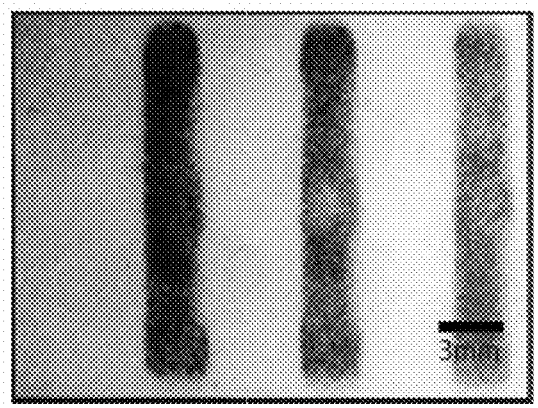
Fig. 14C

MODIFYING MESSAGES STORED IN MIXTURES OF MOLECULES USING THIN-LAYER CHROMATOGRAPHY

CROSS-REFERENCE TO RELATED APPLICATIONS

This application is a continuation of International Application No. PCT/US2020/048190, filed Aug. 27, 2020, which claims the benefit of U.S. Provisional Application No. 62/892,171, filed Aug. 27, 2019, which is hereby incorporated by reference in its entirety.

STATEMENT REGARDING FEDERALLY SPONSORED RESEARCH OR DEVELOPMENT

This invention was made with government support under W911NF-18-2-0030 awarded by the U.S. Army Research Office. The government has certain rights in the invention.

BACKGROUND

Embodiments of the present disclosure relate to storage media, and more specifically, to modifying messages stored in mixtures of molecules using thin-layer chromatography.

BRIEF SUMMARY

According to embodiments of the present disclosure, computer-readable media are provided. A substrate has an array of addressable locations thereon, each addressable location adapted to be physically associated with a collection of molecules, each collection comprising at least a first subcollection of molecules and a second subcollection of molecules. The molecules in the collection are selected from a set of unambiguously identifiable molecules, the set comprising at least a first subset of molecules and a second subset of molecules. Each molecule in the first subset is identifiable by a first physical property, and each molecule in the second subset is identifiable by a second physical property, different from the first physical property. Each molecule in the set is uniquely associated with a predetermined position in a numerical value, wherein the presence of the molecule in the collection indicates a predetermined digit at the associated position and the absence of said molecule in the collection indicates a zero at said associated position.

As used herein, a molecule is uniquely associated with a position when it is associated with exactly one position, irrespective of whether that position is associated with one or more than one molecule. In other words, in various embodiments described herein, more than one molecule can be associated with the same position.

According to embodiments of the present disclosure, methods of and computer program products for writing data to a machine-readable medium are provided. A numerical value comprising a set of digit/position pairs is received, the set comprising at least a first subset of digit/position pairs, and a second subset of digit/position pairs. An association between at least the first and the second subsets of digit/position pairs and the set of digit/position pairs is received. A one-to-one association between at least the first subset of digit/position pairs and a first subset of molecules, and the second subset of digit/position pairs and a second subset of molecules is received, the first and the second subsets of molecules each selected from a set of unambiguously identifiable molecules, wherein each molecule in the first subset is identifiable by a first physical property, and each molecule in the second subset is identifiable by a second physical property, different from the first physical property. A collection of molecules corresponding to the numerical value is determined. Determining the collection comprises: determining at least a first subcollection of molecules corresponding to the first subset of digit/position pairs, and a second subcollection of molecules corresponding the second subset of digit/position pairs, and including at least the first and the second subcollections into the collection of molecules. The molecules of the collection are physically associated with a substrate of the machine-readable medium at an addressable location thereon.

According to embodiments of the present disclosure, methods of and computer program products for reading data from a machine-readable medium are provided. An association between a set of digit/position pairs and at least a first and a second subsets of digit/position pairs is received. A one-to-one association between at least the first subset of digit/position pairs and a first subset of molecules, and the second subset of digit/position pairs and a second subset of molecules is received, the first and the second subset of molecules selected from a set of unambiguously identifiable molecules, wherein each molecule in the first subset is identifiable by a first physical property, and each molecule in the second subset is identifiable by a second physical property, different from the first physical property. A collection of molecules physically associated with a substrate of the machine-readable medium at an addressable location thereon is received, the collection comprising at least a first subcollection of molecules selected from the first subset of molecules, and a second subcollection of molecules, selected from the second subset of molecules. A numerical value comprising the set of digit/position pairs from the collection of molecules is determined. Determining the numerical value comprises: setting each position of the first subset of digit/position pairs to the digit whose associated molecule is present in the first subcollection. Each position of the second subset of digit/position pairs is set to the digit whose associated molecule is present in the second subcollection. The first and the second subsets of digit/position pairs are combined.

In some embodiments, each molecule of the set is a polymer or oligomer. In some embodiments, each molecule of the set is a non-polymeric molecule. In some embodiments, each molecule of the set of unambiguously identifiable molecules is associated with a binary digit.

In some embodiments, the numerical value has a radix and a predetermined number of positions. In some embodiments, the numerical value is a binary value having a predetermined number, N, of bits. In some embodiments, the numerical value is a binary value having 32 bits.

In some embodiments, each collection encodes a bit string. In some embodiments, the bit string encodes an ASCII value.

In some embodiments, each molecule in the set is unambiguously identifiable by its polarity. In some embodiments, each molecule in the set is unambiguously identifiable by its thin-layer chromatography (TLC) retardation factor ($R_f$). In some embodiments, the first physical property is an iodine ($I_2$) reactivity and the second physical property is UV fluorescence.

In some embodiments, each molecule in the collection is linked to the substrate at the respective addressable location. In some embodiments, each molecule in the collection is covalently attached to the substrate at the respective addressable location. In some embodiments, each molecule in the collection is non-covalently attached to the substrate at the respective addressable location.

According to embodiments of the present disclosure, machine-readable media are provided. A substrate has an array of addressable locations thereon, each addressable location adapted to be physically associated with a collection of molecules, each collection comprising at least a first subcollection of molecules and a second subcollection of molecules. The molecules in the collection are selected from a set of unambiguously identifiable molecules, the set comprising at least a first subset of molecules and a second subset of molecules. At least one molecule of the first subset is chemically convertible into at least one molecule of the second subset. Each molecule in the first subset and each molecule of the second subset is identifiable by a physical property. Each molecule in the set is associated with a predetermined position in a numerical value, wherein the presence of the molecule in the collection indicates a predetermined digit at the associated position and the absence of said molecule in the collection indicates a zero at said associated position.

In some embodiments, the first subset and the second subset are disjoint. As used herein, disjoint subsets are subsets having no common elements.

In some embodiments, each molecule in the set is uniquely associated with the predetermined position in a numerical value.

In some embodiments, the at least one molecule of the first subset is chemically reversibly convertible into the at least one molecule of the second subset.

According to embodiments of the present disclosure, methods of and computer program products for writing data to a machine-readable medium are provided. A numerical value comprising a set of digit/position pairs is received, the set comprising at least a first subset of digit/position pairs, and a second subset of digit/position pairs. An association between at least the first and the second subsets of digit/position pairs and the set of digit/position pairs is received. An association between at least the first subset of digit/position pairs and a first subset of molecules, and the second subset of digit/position pairs and a second subset of molecules is received. At least one molecule of the first subset is chemically convertible into at least one molecules of the second subset, the first and the second subsets of molecules each selected from a set of molecules unambiguously identifiable by a physical property. A collection of molecules corresponding to the numerical value is determined. Determining the collection comprises: determining at least a first subcollection of molecules corresponding to the first subset of digit/position pairs, and a second subcollection of molecules corresponding the second subset of digit/position pairs, and physically associating the molecules of the first subcollection with a substrate of the machine-readable medium at an addressable location thereon. At least one molecule of the first subcollection of molecules is chemically converted into at least one molecule of the second subcollection of molecules.

In some embodiments of the machine-readable medium or the method, each molecule of the set is a polymer or oligomer. In some embodiments of the machine-readable medium or the method, each molecule of the set is a polypeptide.

In some embodiments of the machine-readable medium or the method, chemically converting includes enzymatically modifying at least one molecule. In some embodiments of the machine-readable medium or the method, chemically converting includes at least one of acetylating, deacetylating, phosophorylating, and dephosphorylating.

In some embodiments of the machine-readable medium or the method, each molecule of the set of unambiguously identifiable molecules is associated with a binary digit.

In some embodiments of the machine-readable medium or the method, the numerical value has a radix and a predetermined number of positions. In some embodiments of the machine-readable medium or the method, the numerical value is a binary value having a predetermined number, N, of bits. In some embodiments of the machine-readable medium or the method, the numerical value is a binary value having 32 bits. In some embodiments of the machine-readable medium or the method, each collection encodes a bit string. In some embodiments of the machine-readable medium or the method, the bit string encodes an ASCII value.

In some embodiments of the machine-readable medium or the method, each molecule in the set is unambiguously identifiable by a mass spectrometry.

In some embodiments of the machine-readable medium or the method, each molecule in the collection is linked to the substrate at the respective addressable location.

In some embodiments of the machine-readable medium or the method, each molecule in the collection is covalently attached to the substrate at the respective addressable location.

In some embodiments of the machine-readable medium or the method, each molecule in the collection is non-covalently attached to the substrate at the respective addressable location.

BRIEF DESCRIPTION OF THE SEVERAL VIEWS OF THE DRAWINGS

FIG. 10 illustrates a method for reading data from a machine-readable medium is illustrated according to embodiments of the present disclosure.

FIG. 14A-D illustrate mixture of MolBits according to embodiments of the present disclosure.

DETAILED DESCRIPTION

Figure 1A:
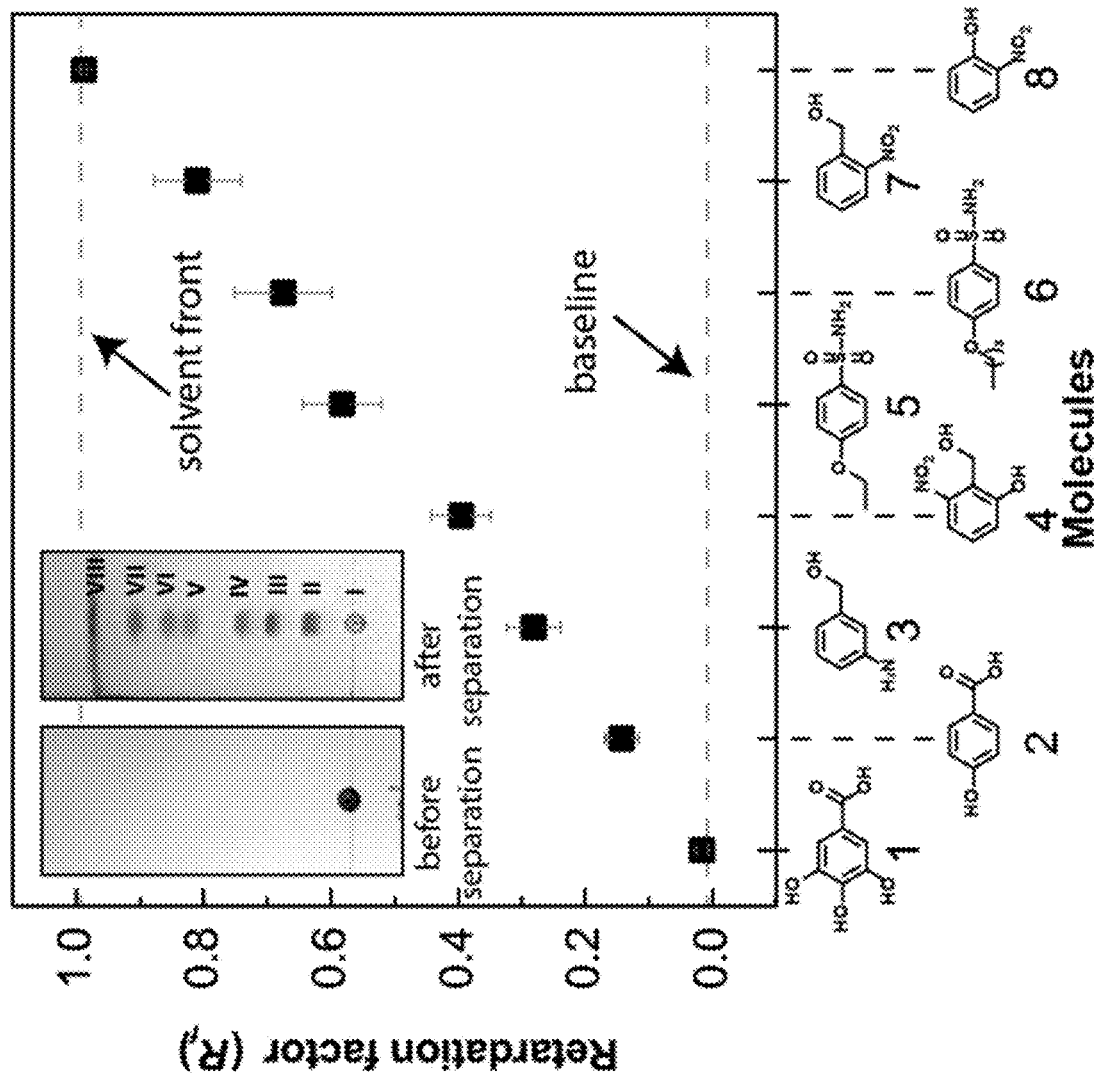
FIG. 1A is a graph of retardation factor ($R_f$) of exemplary molecules for encoding information according to embodiments of the present disclosure.

Molecular methods can be used to store information in mixtures of small molecules (MolBits), but it is unclear how data stored in small molecules could be modified. Here, we decoded mixtures of molecules using thin-layer chromatography (TLC) and used chemical reactions to visualize MolBits (e.g., UV detection; chemoselective, reversible and irreversible stains). We used functional group-specific staining to select subsets (or subsets of subsets) of the molecules present on the plate and thus demonstrated that a single spot (as separated by TLC) can be resolved into multiple bits, which can alter the readout, and thereby the meaning of the message. This work thus integrates storage and modification of messages (represented by binary data) in a single method.

Modification of Bits, when Represented by Molecules, Requires Chemical Reactions.

Molecular methods for archival data storage have inherent advantages in longevity and in security towards tampering over commonly used electronic and magnetic methods, because molecules (the information-encoding states) are stable and cannot easily be altered. These features, however beneficial for storage, seem to impede any form of computation (the specific modification of bits in a bit string). Concepts to modify 'molecular' bits exist for systems using sequence-specific polymers (e.g., DNA, or peptides); they mostly use enzymatic reactions to alter the sequence in ways reminiscent of logic gates in traditional computing. Editing the information stored in (mixtures of) small molecules has not been reported, so far.

Modification of Bits Could Allow Protection of Data.

The ability to modify bit strings upon readout could enable strategies to enhance the security in data storage. Established methods—used, for example, in tracking of transactions ("fingerprinting"), copyright protection, and authentication—reveal a hidden message based on how the information is read (e.g., watermarking, secretly embedded tags in stored data, or steganography, hiding the data altogether) and provide a non-obvious layer of protection. While it is classified as a weak form of security, it can complement cryptography (stronger security, but computationally more expensive), which is intended to completely prevent unauthorized access to data. Examples of embedding secondary data or generating sequence-dependent messages in (bio) chemical methods include hiding a key DNA-sequence among dummy sequences, growth-media-dependent protein expression, and the use of an indicator to discriminate among different chemical inputs. These concepts, require sophisticated methods to encode information (e.g., using DNA strands, or a molecule comprising different fluorophores), limiting the scalability and flexibility of the method to change the meaning of a message.

Information Storage in Mixtures of Small Molecules

We have recently described a new method for storing information as mixtures of molecules, arranged in an array of spots on a plate and read by mass spectrometry (SAMDI). This method is designed in detail elsewhere, but briefly: To define the eight bits necessary to define a character in American Standard Code for Information Interchange (ASCII), we assigned a set of eight distinguishable molecules to the eight bits of the byte. Thus, for molecules $M_1$, $M_2$, ... $M_8$, the eight-digit binary string 01011010 would be represented by a mixture of the molecules $M_7$, $M_5$, $M_4$, $M_2$. The presence or absence of a molecule represents a "1" or a "0" in a binary string of information, and the sequence of digits is determined by a molecular property that all MolBits of the mixture possess (e.g., mass).

Here, we show that the same concept can be implemented with thin layer chromatography (TLC). TLC is a convenient method to separate a relatively small number of molecules on a small plate based on their polarity. It is easily applicable to sets of eight molecules (1 byte), as shown here, or perhaps up to 16 (2 bytes). It is a technique that provides slower reading rates and lower analytical precision than mass spectrometry, but it is inexpensive, simple, requires no power or complex instrumentation, and—importantly—it can use different modes of visualization, e.g., absorbance, fluorescence, or chemical staining. We show that it can be used to encode and store sequences of 12 letters or numbers on one plate (96 bits in ASCII). In contrast to our previous report, where the mass of MolBits was read using MALDI, TLC can reveal different sequences (bits strings or bytes) by optical readout in various colors, depending on the method(s) used for visualization.

Encoding a Message in Mixtures of Molecules.

Figure 1B:
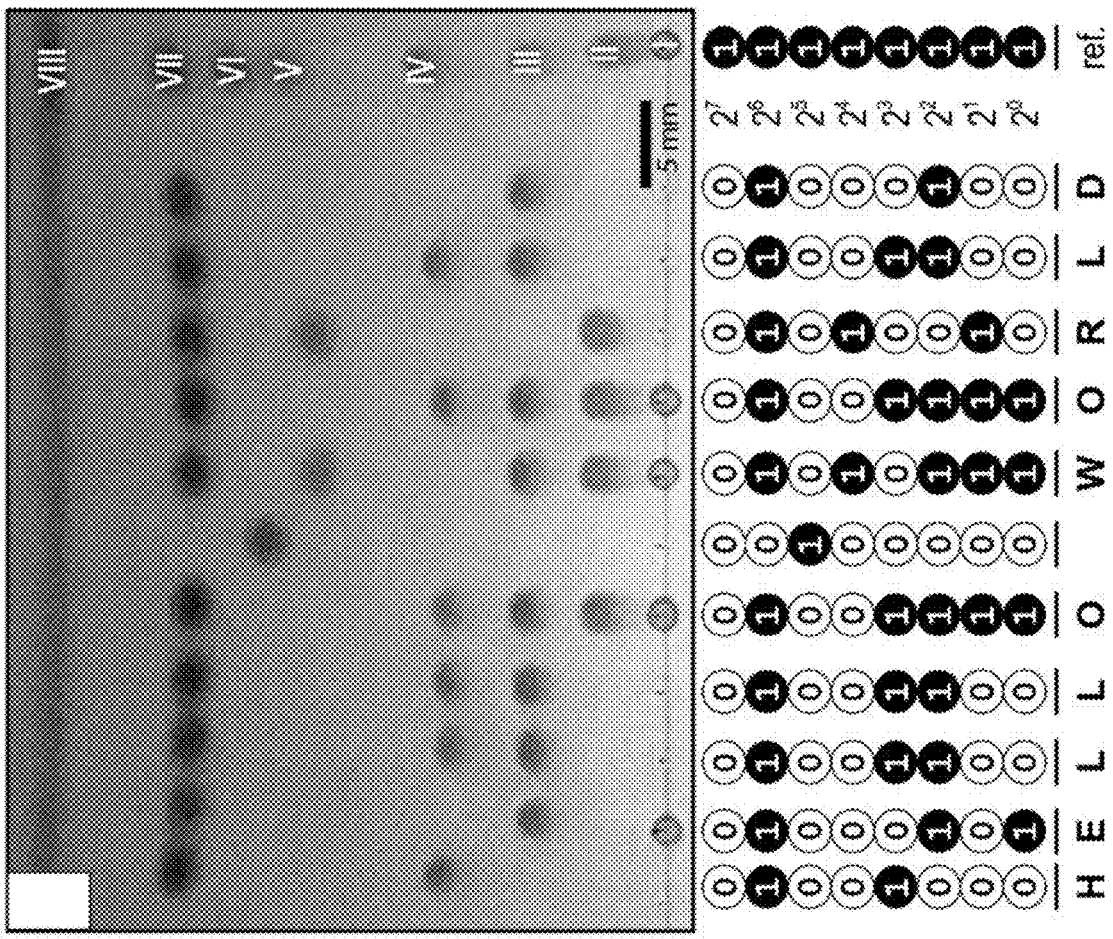
FIG. 1B is an image of an exemplary developed Thin-Layer Chromatography (TLC) plate encoding information according to embodiments of the present disclosure.

FIG. 1: illustrates the encoding of information using Thin-Layer Chromatography according to embodiments of the present disclosure. In FIG. 1A, molecules 1-8, separated on a TLC plate, are identified by their characteristic retardation factors ($R_f$). The error bars show the uncertainty of $R_f$-values based on a triplicate experiment. The average resolution of the separation is $\bar{\sigma}=0.05$, for n=16, see FIG. 6. The inset shows an example of a mixture comprising all eight molecules, separated on a TLC plate and visualized under UV irradiation at 254 nm. FIG. 1B shows a developed TLC plate comprising 12 lanes, each with a mixture of molecules 1-8. The binary data based are depicted below the TLC plate. Binary-to-ASCII conversion results in the message 'HELLO WOLRD'. TLC plates were developed using dichloromethane/methanol (20:1) as the mobile phase and processed as described in the Methods.

Figure 4:
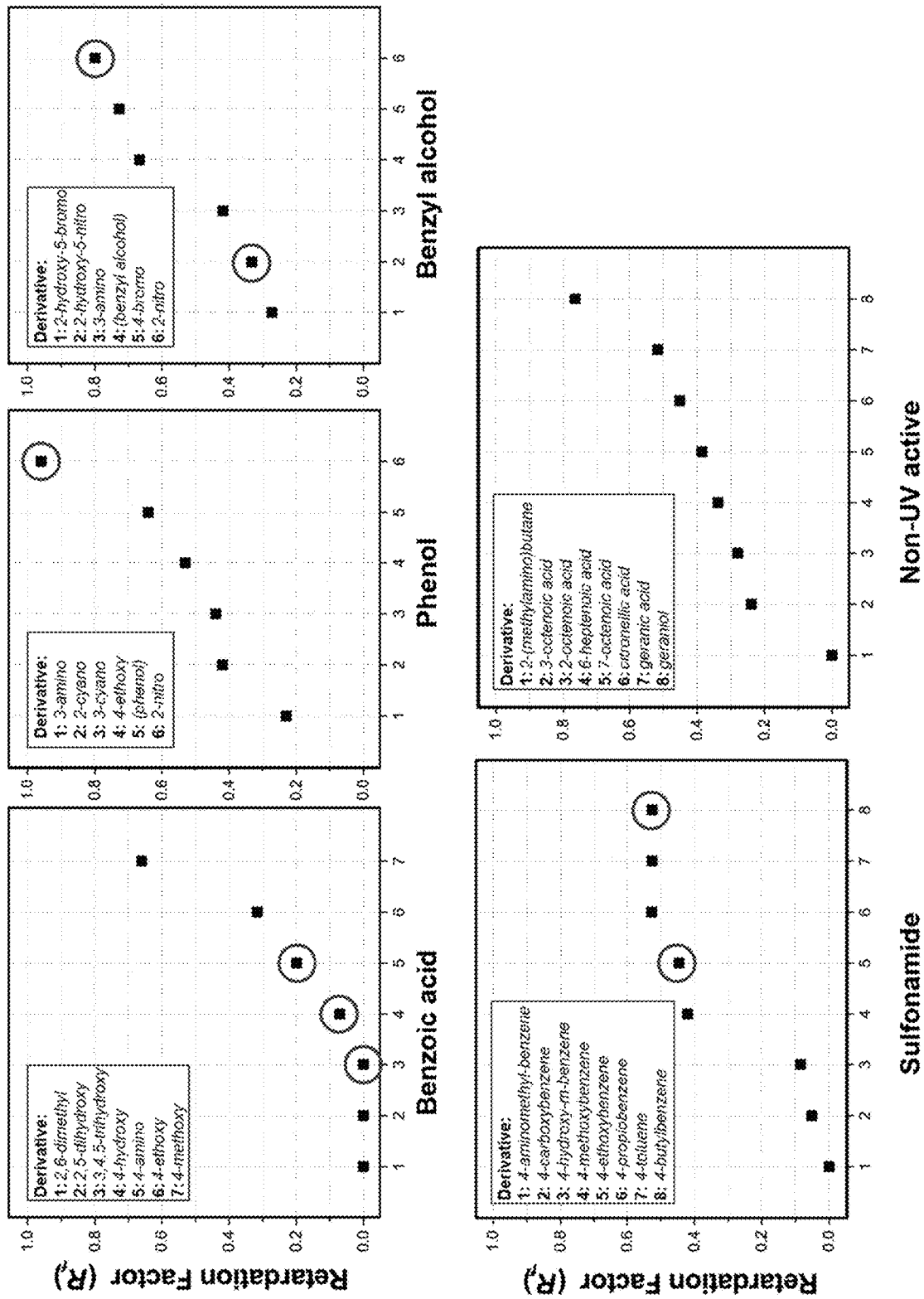
FIG. 4 is a set of graphs of retardation factor ($R_f$) of exemplary molecules for encoding information according to embodiments of the present disclosure.

We selected eight molecules (1-8), chosen from a library of commonly available, UV-absorbing molecules (derivatives of benzoic acid, phenol, benzyl alcohol, and benzene sulfonamide, FIG. 4), to approximately evenly cover the range of $R_f$ values from 0 to 1 (FIG. 1A). The presence or absence of a spot (after visualization) at any of these eight $R_f$ values represents a MolBit ("1" or a "0") at the respective eight binary digits of a byte. Thus, the letter "g" (the $103^{rd}$ symbol in ASCII, converted to the binary bit string 01100111 as a representation of $0 \cdot 2^7 + 2^6 + 2^5 + 0 \cdot 2^4 + 0 \cdot 2^3 + 2^2 + 2^1 + 2^0$) is the mixture 7+6+3+2+1 (see Table 1). For each character in the message, we deposited a sample containing an appropriate mixture of the molecules 1-8 on the TLC plate (FIG. 5). Upon development of the plate, all mixtures simultaneously separated into distinct spots (I-VIII) on the TLC plate. We photographed the plate after separations were completed (a fully developed plate; approx. 5 min), using a smartphone camera and edited the pictures for clarity using ImageJ (see Method Section for further details).

FIG. 1B shows an example of a developed plate, visualized under UV light (at 254 nm), with 12 mixtures, each containing a specific combination of the molecules 1-8, in 12 parallel lanes. The rightmost lane contains all eight compounds and serves as a reference for the expected $R_f$ values of separated Molbits. A binary-to-ASCII conversion of the MolBits contained in the other 11 lanes revealed the message HELLO WORLD. Hence, short messages can be encoded in mixtures of MolBits using polarity of molecules to indicate the sequence of digits in a binary representation.

Staining Selects Subsets of the Encoded Information

FIG. 2 illustrates decoding information using different visualization techniques according to embodiments of the present disclosure. FIG. 2A is an illustration of 16 MolBits that separates into eight 'sets' of $R_f$ values I-VIII. Sets IV and V, serve as examples of how each set can be built up from multiple MolBits that can be readout differently using various visualization methods. See FIG. 7 for the summary of the full screening. FIG. 2B shows MolBits 5, 7, 9-13, 16 separated on a TLC plate and visualized under iodine ($I_2$) and UV irradiation at 254 nm. The functional group that is stained with $I_2$ (red), or visualized with UV (grey), is highlighted in the chemical structures. FIG. 2C shows a developed TLC plate comprising 11 lanes, each with a mixture of molecules 5, 7, 9-13, 16, read out using $I_2$ and UV. FIG. 2D shows the binary from FIG. 2C converted into text using a four-digit or eight-digit lookup table (hex, and ASCII, respectively). The presence of a MolBit is indicated by a closed circle, the absence of a MolBit is indicated by an open circle. MolBits that are invisible to the corresponding stain are not circled.

Figure 2A:
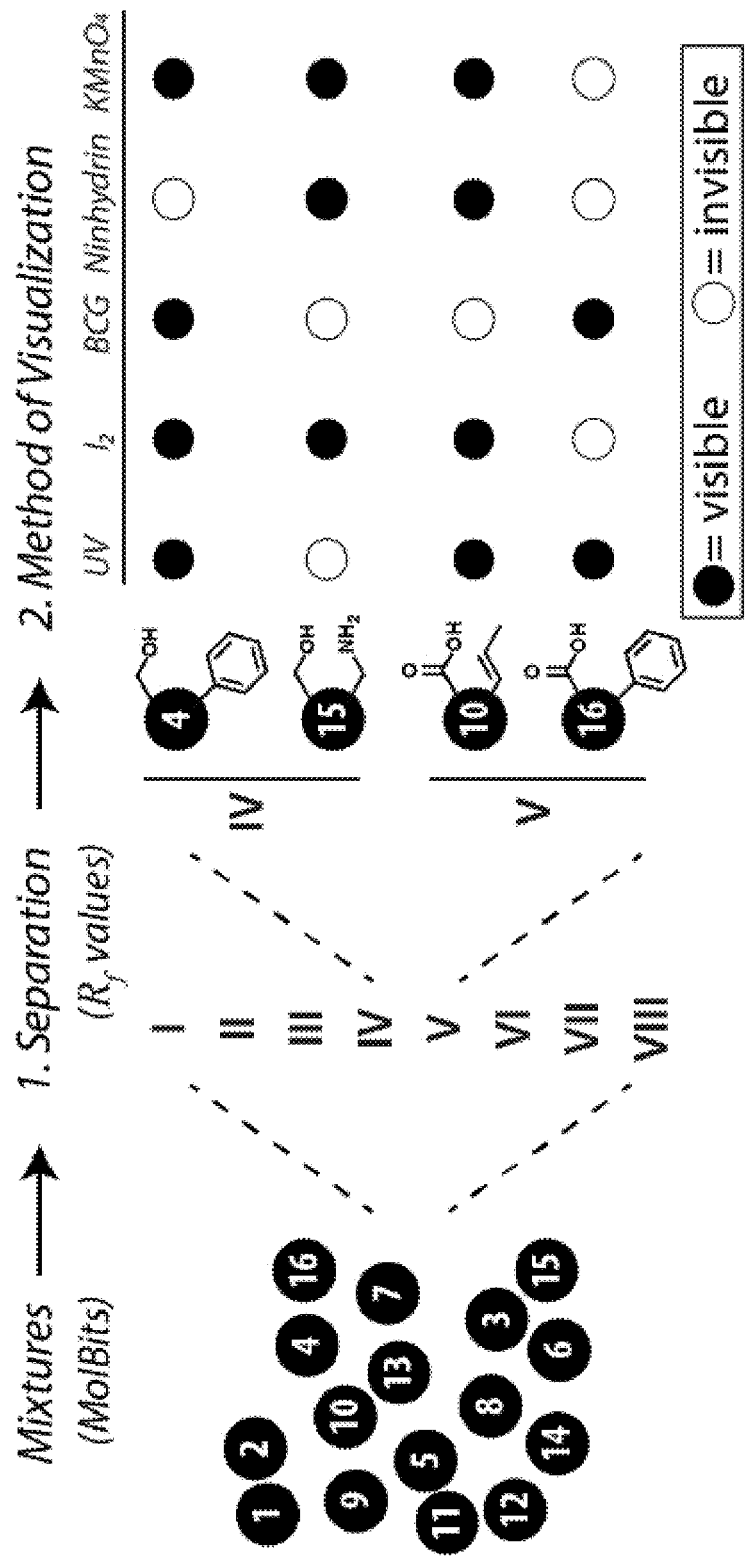
FIG. 2A is a schematic illustration of 16 exemplary MolBits for encoding information according to embodiments of the present disclosure.

Chemoselective staining enables control over the read-out of mixtures that comprise multiple MolBits at the same $R_f$ values (FIG. 2A). To explore the potential of combining TLC with staining and visualization, we expanded our initial library with eight additional MolBits (9-16). The number of locations on the developed plate (specifically: ranges of $R_f$ values) remains the same as when we used MolBits 1-8 but each 'group' could hold one, two, or three MolBits. Each of the eight sets of molecules contains MolBits with similar polarity—and thus with very similar $R_f$ values ("$R_f$ sets" I, II, III, etc.)—but different types of functional groups (primary and phenolic alcohols, amines, carboxylic acids, conjugated and unconjugated double bonds). FIG. 2A illustrates how these differences in chemical reactivity (but not polarity) result in various possibilities to use UV irradiation and (common) chemoselective methods—such as, iodine vapor ($I_2$), bromocresol green (BCG), ninhydrin, or potassium permanganate ($KMnO_4$)—to visualize MolBits. Table 3 lists the visibilities of all 16 MolBits with the stains used.

Figure 2B:
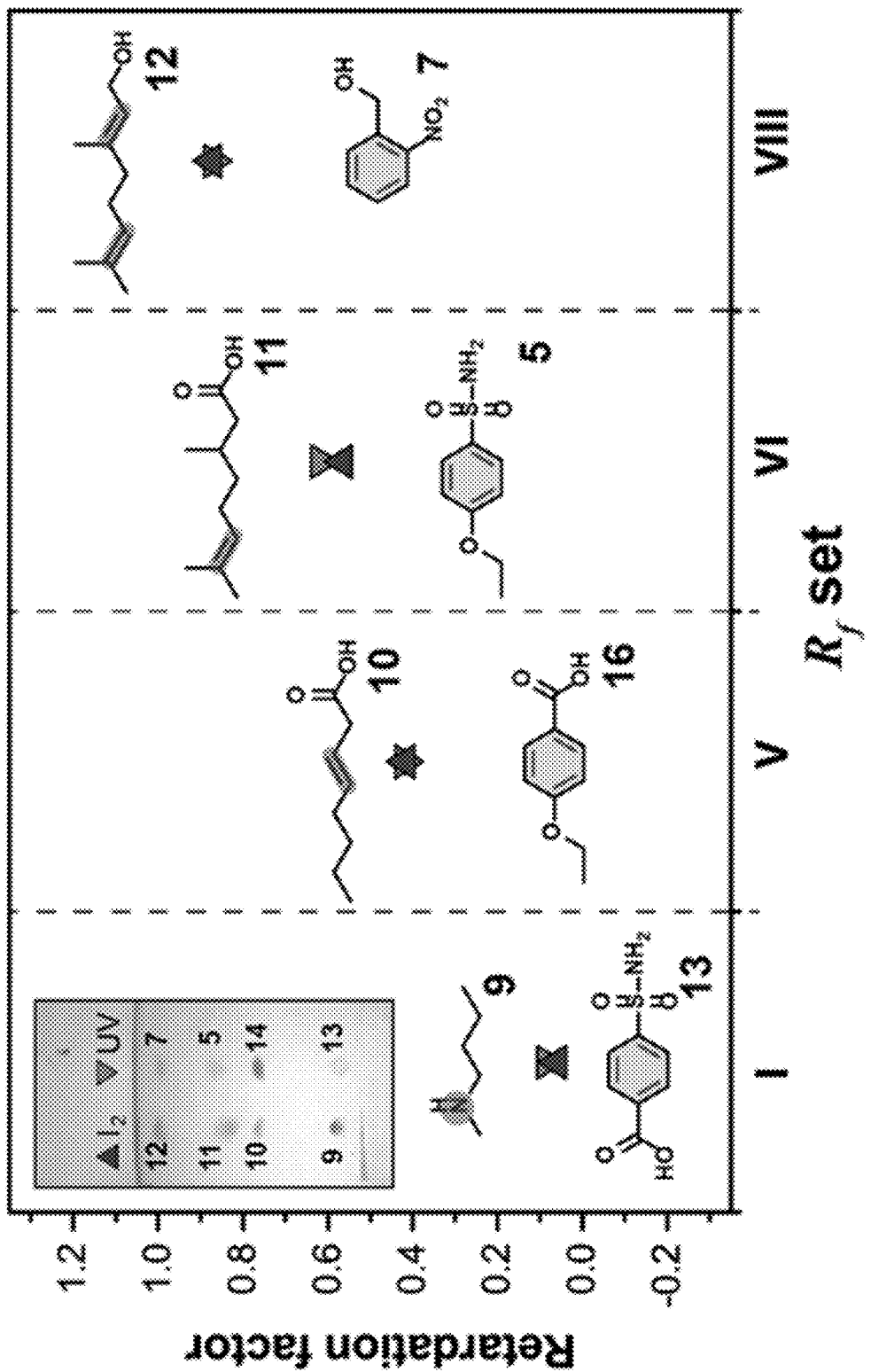
FIG. 2B is a graph of retardation factor ($R_f$) illustrating sets of MolBits for encoding information according to embodiments of the present disclosure.
Figure 2C:
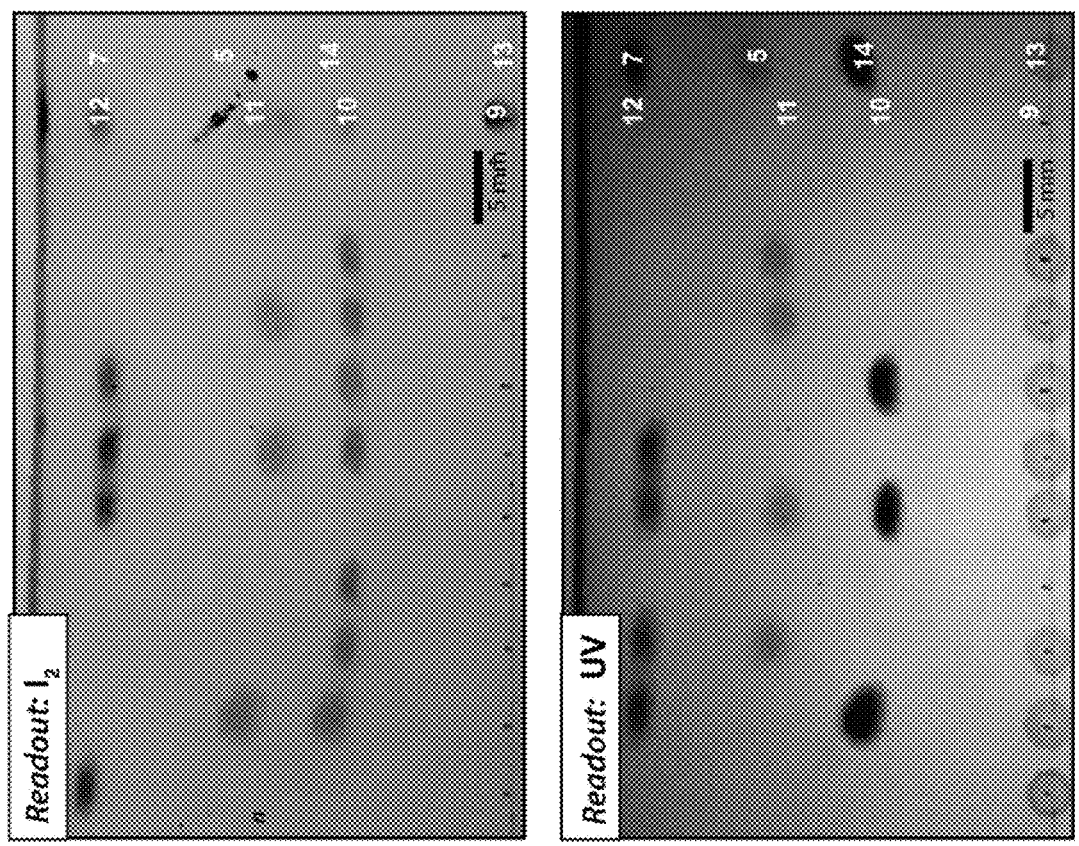
FIG. 2C is an image of an exemplary developed Thin-Layer Chromatography (TLC) plate encoding information according to embodiments of the present disclosure.
Figure 2D:
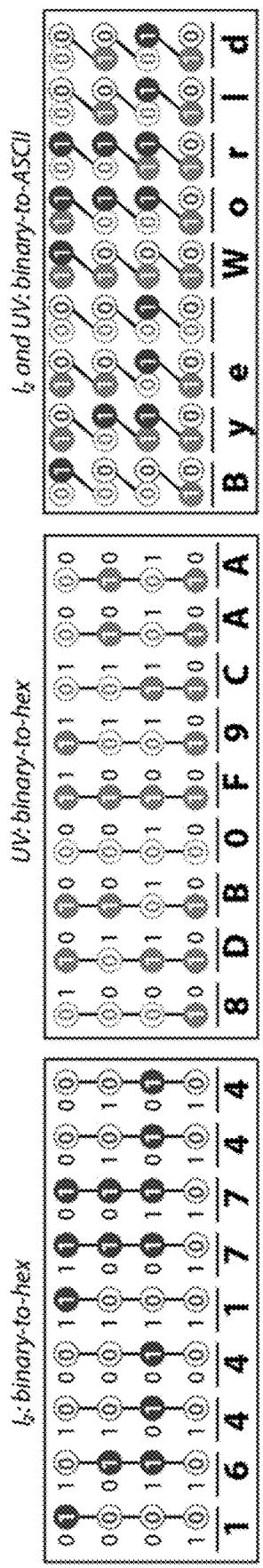
FIG. 2D is a schematic view of an exemplary text conversion of information encoded according to embodiments of the present disclosure.

We show the concept of subsetting from mixtures by encoding messages using mixtures that contain a selection of MolBits 5, 7, 9-13, 16 and decoding them with two different stains (UV, and iodine, $I_2$) (FIG. 2B). The spots of these sets of molecules appear within the $R_f$ sets I, V, VI, or VII (each set spanned 0.05 $R_f$ units or less). Because each set is represented by a pair of molecules with orthogonal properties, and because both methods of visualization are non-destructive and reversible, information encoded on TLC plates can be decoded in two orthogonal ways. FIG. 2C shows two developed plates, with 11 mixtures, each containing a specific combination of the set {5, 7, 9-13, 16}, visualized with iodine ($I_2$) and under UV light (at 254 nm). The reference lanes validate that compounds 5, 7, 13, 16 are not visible when the plate is stained with 12, and 9-12 are not visible under UV. Each lane thus encodes a 4-bit string, which can represent any hexadecimal symbol (0, 1, . . . , 9, A, . . . , F). The same set of four mixtures on one plate can be decoded to "164417744" when visualized with $I_2$, and to "8DB0F9CAA" when visualized with UV (FIG. 2D). The use of other visualization methods, especially those that stain the TLC plate irreversibly, could be used to prohibit reading parts of the message, at least by colorimetric detection.

In the third example (FIG. 2D), the message is revealed when the results from both visualization methods are combined into one signal: Two 4-bit strings are multiplexed into one 8-bit string. We used an encoding scheme that orders the compounds by i) the location of the spot (the $R_f$ set), and ii) the composition of the MolBits in the set (the respective responses of the pair to $I_2$ and UV): $9=2^7$, $13=2^6$, $10=2^5$, $16=2^4$, $11=2^3$, $5=2^2$, $12=2^1$, $7=2^0$). Converting the multiplexed results from binary to ASCII (an 8-bit codepage) reveals the message Bye World. Crucially, the decoupling of visualization of MolBits (ordered at pre-defined, but arbitrary, $R_f$ values) introduces flexibility in organizing bit strings.

Multiple Staining can Produce Sequence-Dependent Subsets.

Figure 3:
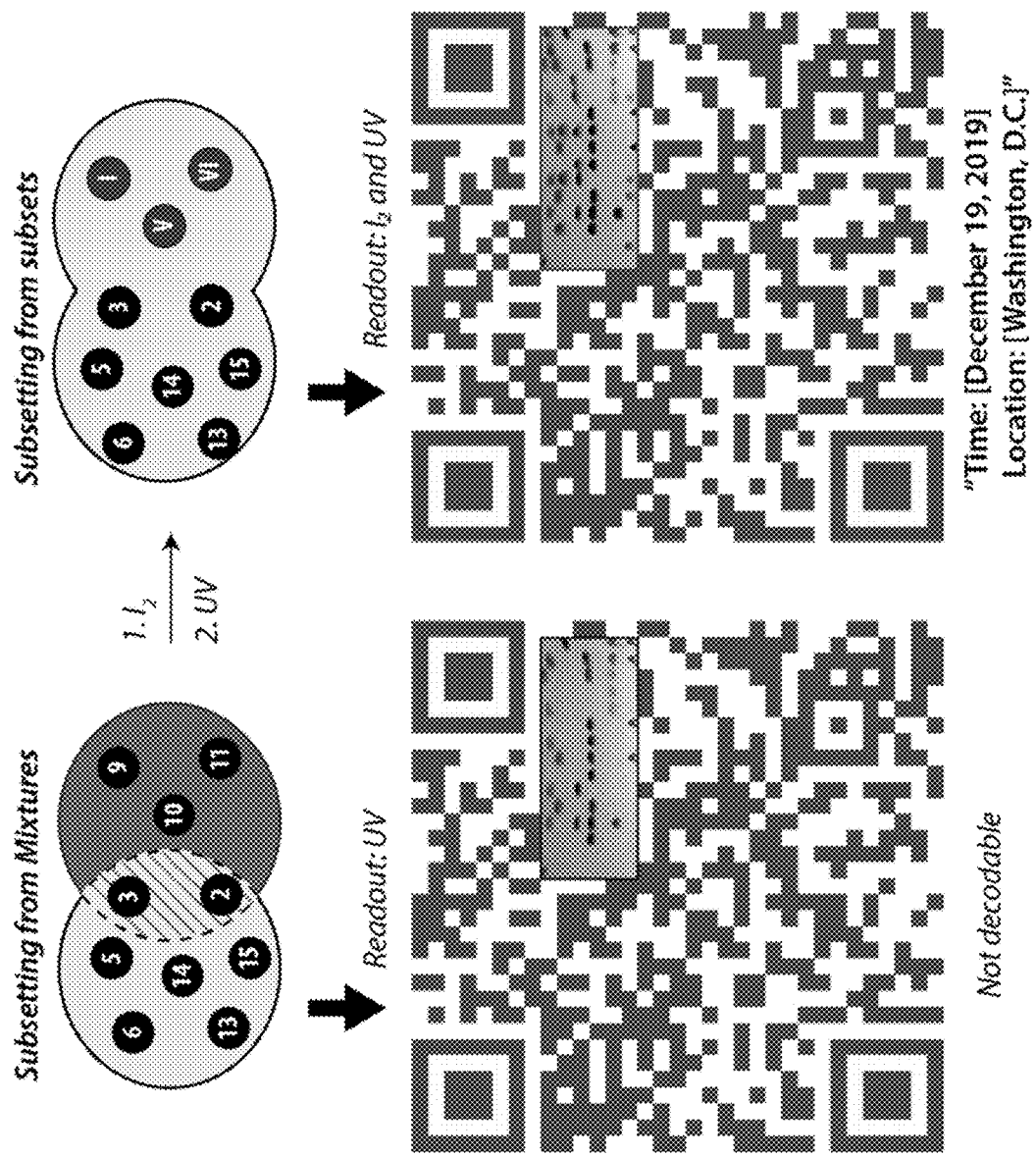
FIG. 3 is a schematic view of subsets and associated QR codes encoding information according to embodiments of the present disclosure.

FIG. 3 illustrates selection of a subset from a subset according to embodiments of the present disclosure. Illustration of subsetting form a mixture of MolBits (using UV) compared to subsetting from a subset (using $I_2$, and UV, sequentially). The developed TLC plates were cropped and inserted in the QR code to reveal the information that was masked "Time: [December 2019], Location: [Washington, D.C.]". See FIG. 8 for details of the pattern substitution with TLC plates.

Figure 7:
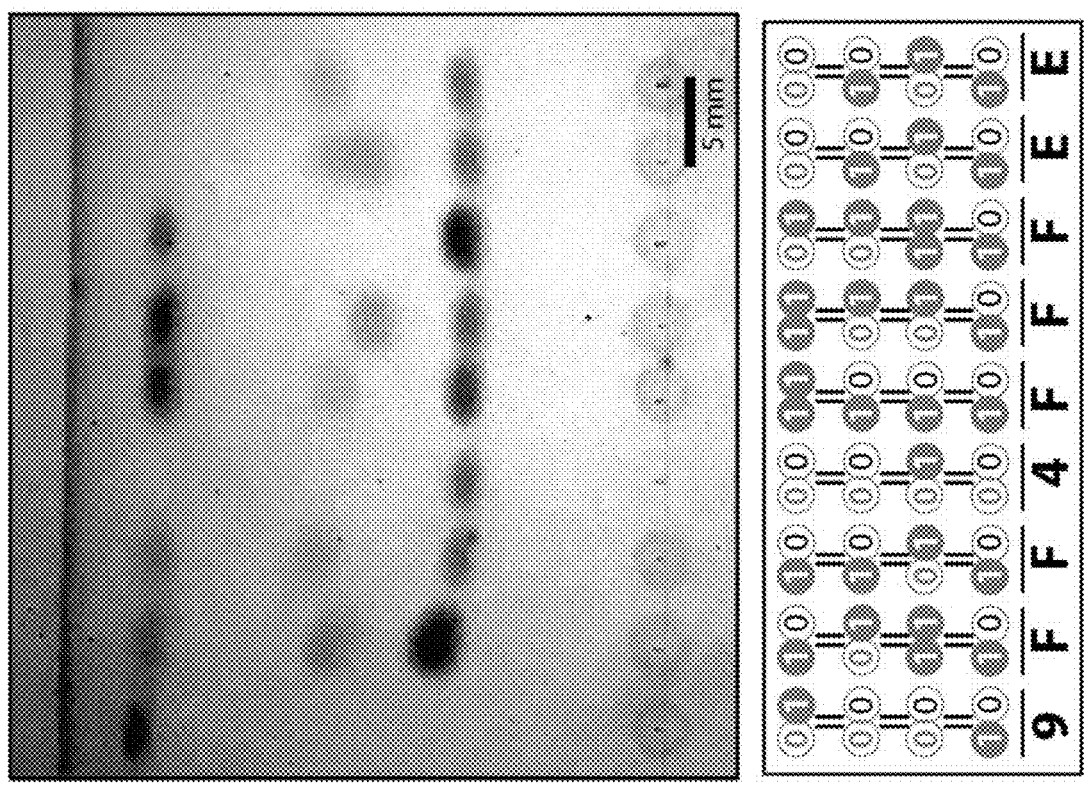
FIG. 7 is an image of an exemplary Thin-Layer Chromatography (TLC) plate encoding information according to embodiments of the present disclosure.

The readout can be modified by selecting a subset based on sequential staining. For instance, compounds 9-12 do not absorb UV light, but become visible under UV after they have been treated with iodine. When the same plate in FIG. 2C was stained with $I_2$ prior to visualization under UV, the lanes that contain one of the pair of molecules with orthogonal properties, or both, will show as a spot. The bit string in lane 1 changes from "1000" to "1001", and in lane 2 changes from "1011" to "1111", etc., which means that the message "8DB0F9CAA" changed into "9FF4FFFEE" (FIG. 7). This type of bit modification (flipping 0's to 1's) is inherently limited in the possibilities to create meaningful messages in absence of modifications allowing for the opposite bit transition (flipping 1's to 0's). We nevertheless argue that the possibility of both bit transitions, even if limited in numbers, can be useful.

We used the same modification to enable the decoding of a Quick Response (QR) code (FIG. 3). The secured information of the QR code (here, the time and location of an event) is initially unreadable because a part of the pattern was masked. The mask was lifted (or more precisely, replaced) by incorporating the pattern on the TLC plate, but only when it was visualized with $I_2$ followed by UV. A standard QR code reading app on a smartphone is capable of decoding the pattern, even when the spots were offset (e.g., the two right most lanes). Despite the robustness of the decoding algorithm, the incorporation of patterns that were visualized with either UV or $I_2$ (FIG. 8) alone did not reveal the encoded information. The use of sequential staining (or more generally, chemical reactions) thus allows subsetting from a subset, in this case, to reveal, but more generally to modify the meaning of a message.

The present disclosure demonstrates the encoding of short messages using mixtures of MolBits using the molecular properties polarity and chemical reactivity to indicate the sequence of digits in a binary representation. Simple staining chemistry was used to alter the read-out of the information in ways that allowed a single spot (as separated by TLC) to be resolved into multiple bits. We showed that data in the encoded information can be hidden (by using mixtures with additional MolBits at the same $R_f$'s) and modified (by reading out the same mixture with different stains sequentially, and depending on the order of the sequence).

Since in our approach information is determined by reading the presence or absence of spots, additional MolBits with similar $R_f$'s but different functional groups would expand the possibilities for control over the readout, by increasing the number of possible subsets. Subsetting of information, and combinations of reversible and irreversible staining chemistry allow for multiplexing of messages, a concept that could also find applications in methods for securing information (e.g., by concealing or destroying data). Although the selection of subsets (or subsets of subsets) bears similarities with Boolean logic—for instance, ninhydrin staining of amines represents a logical AND operation, since the output color is only produced when both inputs amine and ninhydrin are present—the features we presented here are not designed to act as molecular logic gates, which ideally would have compatible inputs and outputs to enable the formation of logic circuits.

Our strategy integrates the processes of encoding and decoding of short messages, based on molecular properties that can easily be exploited by established chemical concepts and methods, such as chromatographic separation, miscibility, and functional-group-specific staining. Our examples demonstrate that an intended, sensical information was only revealed from combinations of appropriate 'MolBits' and the correct stain. The molecules we used to define MolBits do not require extensive synthesis—in fact, they and similar molecules are cheaply available. Any message that can be written using the character of the ASCII-like look-up table can be written by mixing a selection from the same set of molecules, without any synthesis.

The concepts explored in this work are not limited to the chromatographic capacity of TLC and sensitivity to visualization, but could logically and practically be extended to other existing technology, including separation methods with a higher resolution than that of TLC (e.g., high-performance liquid chromatography, gas chromatography, capillary electrophoresis). TLC does, however, not require any power to operate, is available in virtually any chemical laboratory, and can easily be employed in resource-limited settings, including staining operations. These characteristics set it apart from more sophisticated technology, and its simplicity enables the quick exploration and development of new contributions to molecular systems that store and process information.

Chemicals and Materials

Commonly available molecules (derivatives of benzoic acid, phenol, benzyl alcohol, benzene sulfonamide, and unsaturated alcohols and carboxylic acids, FIG. 4) and solvents (methanol, and dichloromethane) were purchased from Sigma Aldrich, Fluka and VWR, and used as received. Aluminum plates coated with silica-oxide stationary phase (with 60 Å medium pore diameter and particle size of 8.0-12.0 μm) with fluorescence indicator (manganese-activated zinc silicate) were purchased from Sigma Aldrich. Precision glass capillary tubes (inner diameter=0.4 mm, length=75 mm) were purchased from Sigma Aldrich. Ultra-fine glass capillary tubes were prepared by stretching a hot glass Pasteur pipet, heated by a Bunsen burner.

Methods of Measurement and Characterization

TLC plate preparation. Samples containing an appropriate mixture of compounds (each dissolved in methanol, 20 mM) were deposited on the TLC plates (1 cm from the bottom edge). Each lane is separated by a distance of 0.5 cm. The plate sizes varied: For a typical experiment (separation length, 4 cm, and lanes, 12), we used a 6×8 cm plate (4×6 cm is required for separation, and additional 1 cm from each edge is required for a reproducible separation). Analyte was drawn from a sample (typically ~0.1 μL) and deposited it onto a TLC plate as a spot, using glass capillaries tubes. The solvent is allowed to evaporate completely after deposition, to prevent it from interfering with sample's interactions with the mobile phase during the development of the TLC.

Separation on a TLC. The samples separated into distinct spots on the TLC plate upon development of the plate in a closed chamber, using an eluent with a composition of dichloromethane and methanol (20:1). A small amount of the eluent is poured into a standard separation chamber to a depth of less than 1 centimeter. Subsequently, the separation chamber is closed, allowing the eluent to saturate the chamber (for ~one minute), prior to placing the TLC plate in the container. The solvent moves up the plate by capillary action carrying the analyte up the plate and separating the components in the analyte. Finally, the plate is removed from the chamber when the solvent front reaches a height of 3-4 cm (which required approximately 6 minutes to develop) and is allowed to dry.

Visualization of the TLC plate. TLC plates are visualized by illumination with UV light at a wavelength of 254 nm (the adsorbent layer fluoresces light green under UV light, unless the presence of compounds quenches the fluorescence), and/or visualized using standard TLC staining techniques. The stains were prepared following literature procedure and applied by immersing the plate in the appropriate solution. Bromocresol green (BCG), and ninhydrin react specifically with functional groups on the compounds: BCG deprotonates a carboxylic acid, and ninhydrin exclusively reacts with primary and secondary amines. Potassium manganese ($KMnO_4$) and iodine ($I_2$) are less selective than BGC and ninhydrin. We summarize the results from the screening of various stains in Table 3.

Image processing, and conversion into $R_f$ values. We photographed the plates, stained or visualized with UV, using a smartphone camera. Image processing steps include split color, enhance contrast, image-to-densitogram conversion, $R_f$ analysis, and were performed using National Institutes of Health (NIH) ImageJ, as follows: i) The original image is separated into red, green, and blue channels using function run ("Split Channels"). ii) Subsequently, the image from the green (when visualized with UV) or blue channel (when visualized with a stain) was selected, cropped, and the contrast is enhanced. iii) The image is viewed by an array of lines (one line per lane), using functions makeLine($x_1$, $y_1$, $x_2$, $y_2$) and roiManager("Add") for each lane, and converted into a set of densitograms, using functions roiManager ("Multi Plot"). iv) Finally, the pixel positions p are converted into retardation factor $R_f$ values: $R_f=1+(p-p_{s.f.})/(p_{s.f.}-p_{b.l.})$. In here, s.f. and bl. denotes the solvent front and the baseline, respectively.

Screening of Molecular Structures Suitable for TLC Separation.

FIG. 4 illustrates compound classes separated by TLC and ordered by their retardation factors. Compounds used as Molbits 1-8 in the main text are indicated by a circle. Classes of compounds were screened and MolBits were selected for their differential polarity.

Figure 5A:
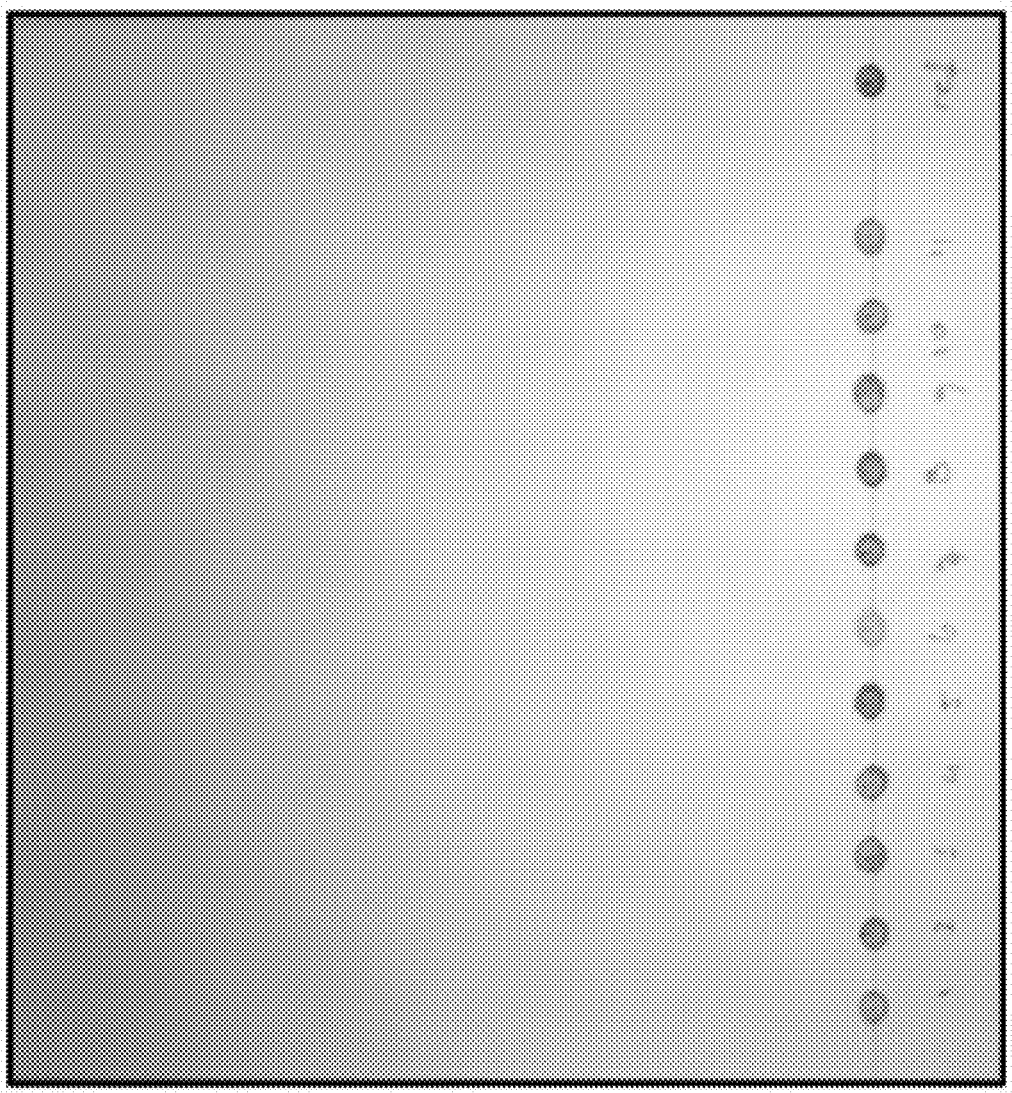
FIG. 5A-5B are images of an exemplary Thin-Layer Chromatography (TLC) plate encoding information according to embodiments of the present disclosure.
Figure 5B:
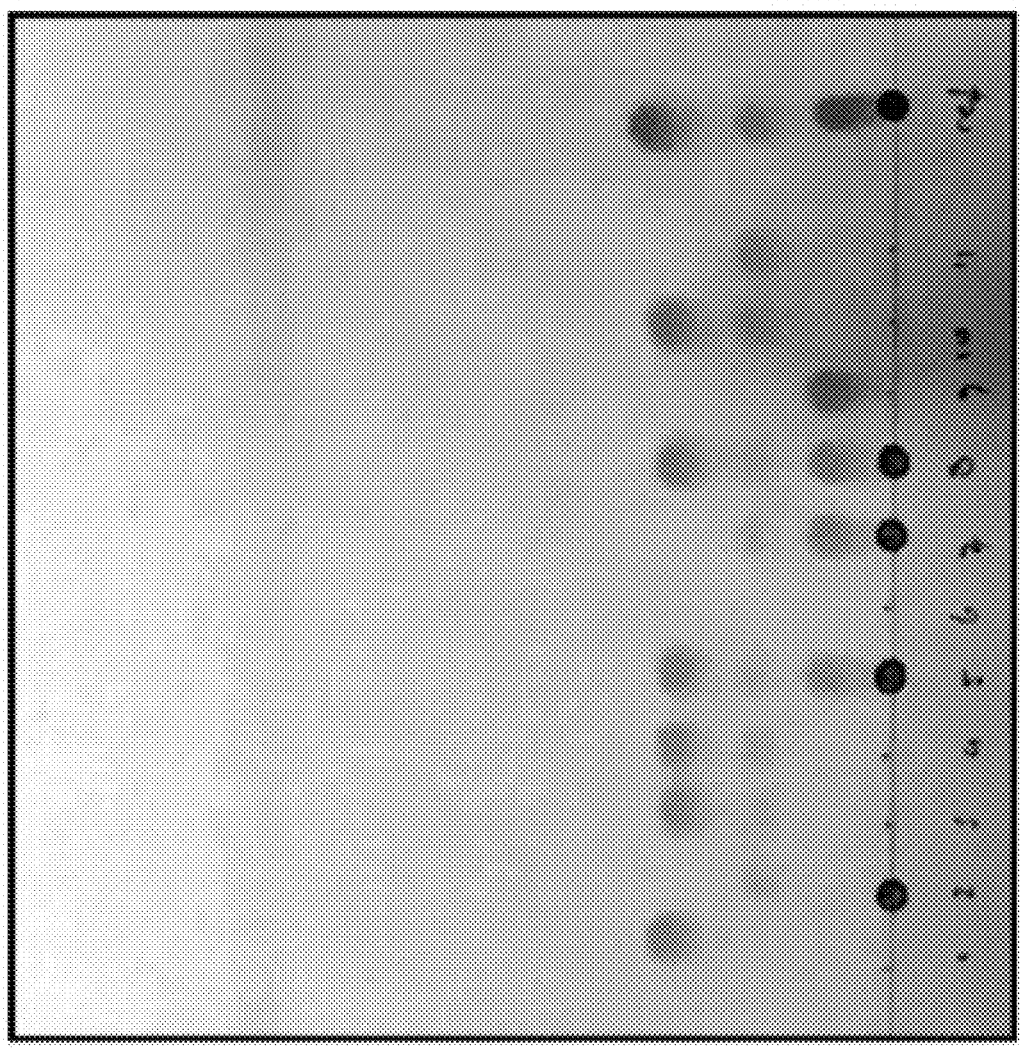

FIG. 5 shows a TLC plate encoding HELLO WORLD. FIG. 5A shows the plate before mixtures of MolBits 1-8 were separated. FIG. 5B shows the plate after they were separated but visualized with iodine.

Details of Separation Using TLC

Examples of TLC plates. TLC plates, undeveloped and stained with iodine, depicted in FIG. 5 show the supplementary information of main text FIG. 1.

Figure 6A:
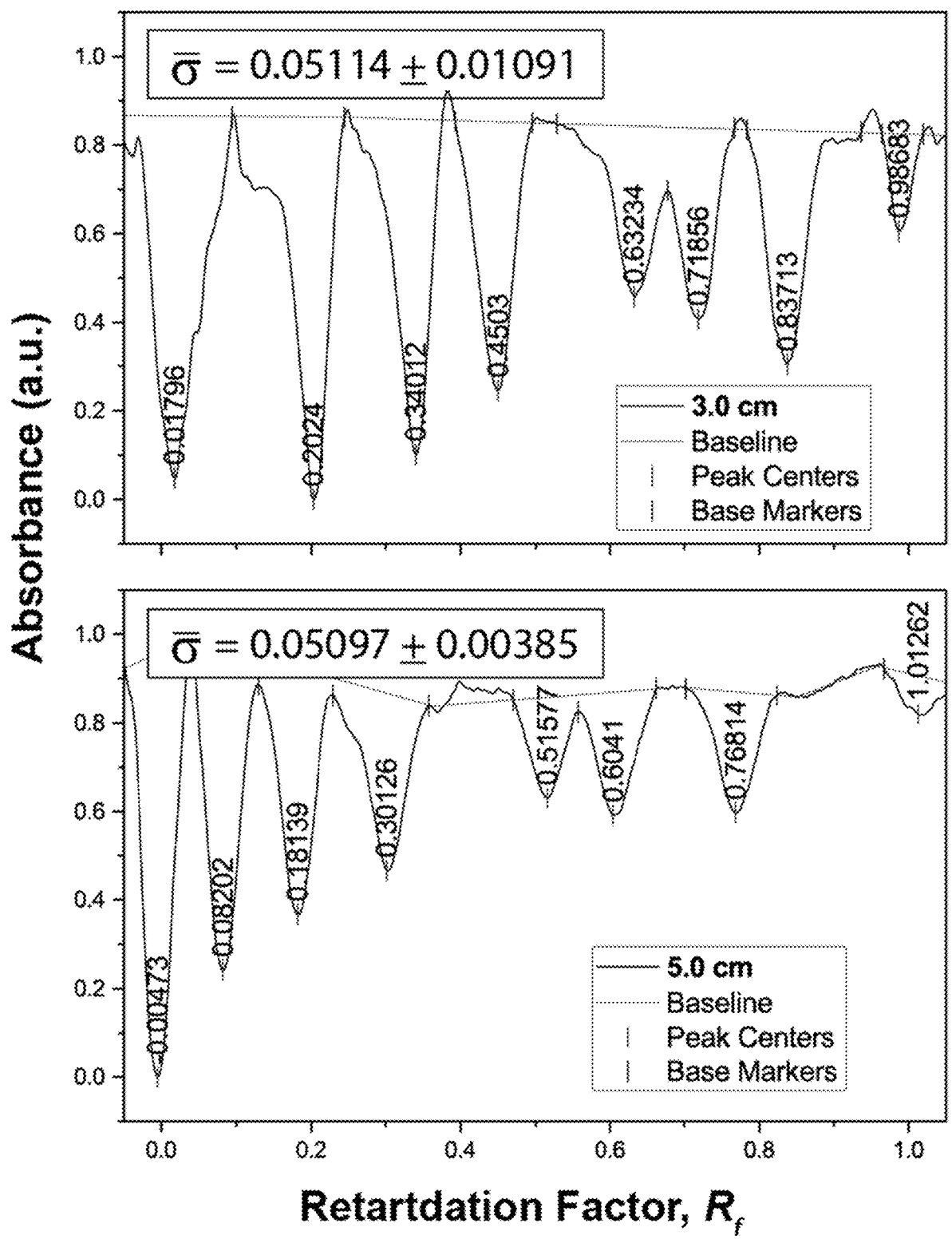
FIG. 6A is a set of densitograms of Thin-Layer Chromatography (TLC) plates developed over different separation lengths according to embodiments of the present disclosure.
Figure 6B:
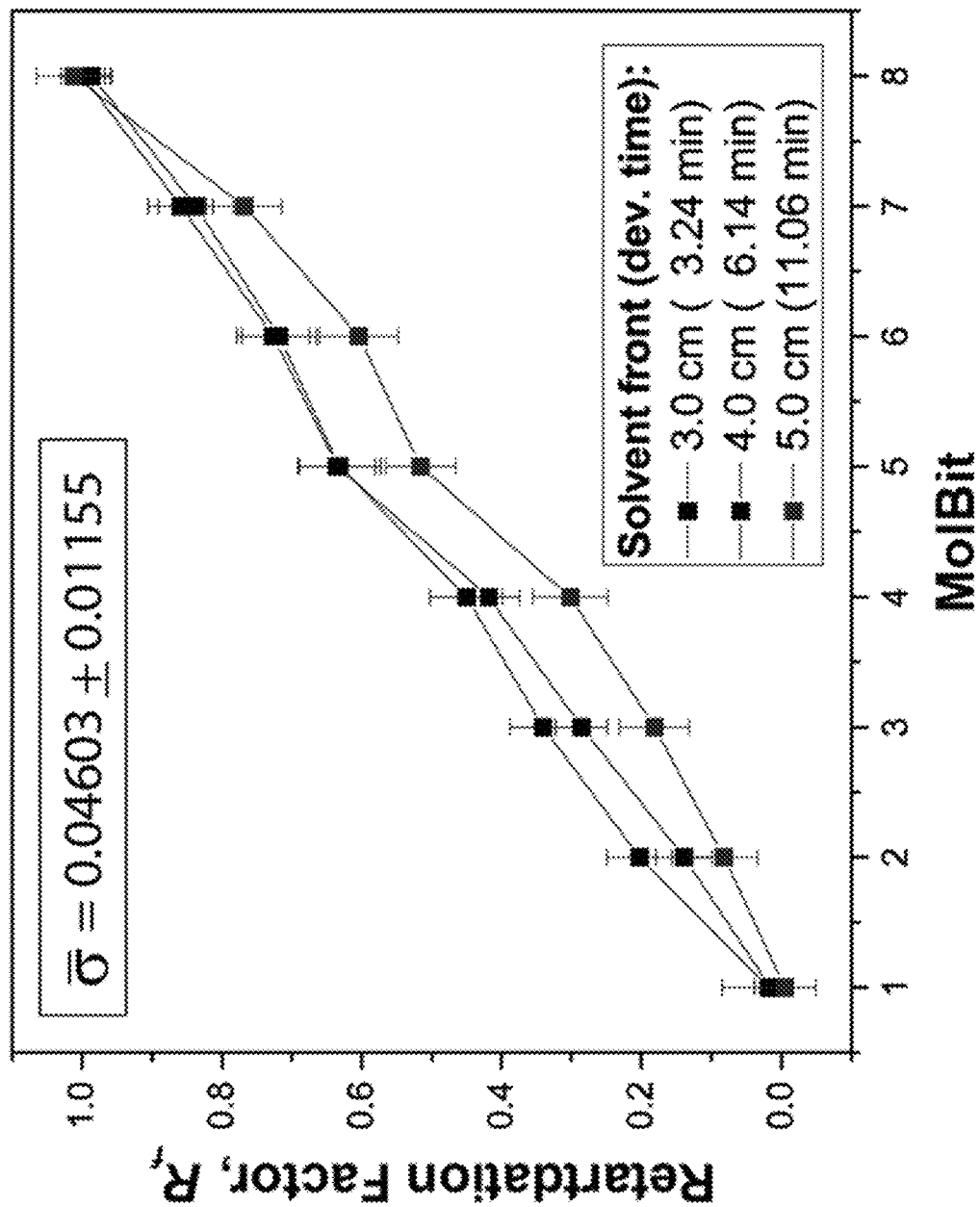
FIG. 6B is a graph of retardation factor ($R_f$) showing the influence of separation length according to embodiments of the present disclosure.

FIG. 6 illustrates Determination of the resolution of separations based on TLC. FIG. 6A shows densitograms of TLC plates developed over different separation lengths. FIG. 6B shows the influence of separation length on the retardation factor $R_f$. Time required for the solvent front to development of the plates is given in the insert.

Separation length and Resolution of separation. We determine the resolution of the separation in TLC (the average resolution $\bar{\sigma}$) by analyzing the separation of MolBits 1-8, developed on plates of which the 'separation length' was varied between 3.0 and 5.0 cm. The separation length is defined as the distance between the solvent front and the baseline. We converted the pates into densitograms and identified the peak centers (which determines the $R_f$ values) and full-width-at-half-maximum (FWHM, which determines the resolution σ of each spot). Densitograms of plates with separation length 3.0 and 5.0 cm (FIG. 6A) show that 1-8 can be resolved with the same average resolution $\bar{\sigma}$ but that some $R_f$ values change due to the difference in the separation length. To ensure reproducible $R_f$ values, separations were carried out using a separation length of 3-4 cm (FIG. 6B). The average resolution $\bar{\sigma}$ over 8 MolBits, developed between 3.0 and 4.0 cm (N=16), is 0.046±0.012.

Storage density on a TLC plate. TLC provides an information density of at least 8 bit per lane, which on a plate of 10.0×6.0 cm equals to 2.1 bits per $cm^2$ (based on 16 lanes, separated by 0.5 cm). For this calculation, we used precision glass capillaries for the manually deposition of MolBits 1-8. The density can be increased by 4-fold, if spot sizes are reduced, achieved with ultrafine capillaries tubes (see Methods), and additional MolBit 9-16 are incorporated. These implementations could allow for the deposition of 32 lanes with 16 bits per lane on a plate with identical dimensions, and thus increase the density to approximately 8 bits per $cm^2$. A number that could further be improved by increasing the performance of the stationary phase, or the kinetics of the capillary action.

Information Encoding Based on Lookup Tables.

Mixtures of eight molecules allow encoding of binary data corresponding to ASCII characters (Table 1), or hex digits (Table 2).

Table 1 lists Writable symbols, used for encoding 'ASCII characters' in mixtures of molecules.

TABLE 1

| Symbol | Numeral base system | | Mixture of Molecules compound | | | | | | | |
|---|---|---|---|---|---|---|---|---|---|---|
| | DEC | Binary | 1 | 2 | 3 | 4 | 5 | 6 | 7 | 8 |
| HT | 9 | 0000 1001 | | | | | x | | | x |
| CR | 13 | 0000 1101 | | | | | x | x | | x |
| space | 32 | 0010 0000 | | | x | | | | | |
| ! | 33 | 0010 0001 | | | x | | | | | x |
| " | 34 | 0010 0010 | | | x | | | | x | |
| # | 35 | 0010 0011 | | | x | | | | x | x |
| $ | 36 | 0010 0100 | | | x | | | x | | |
| % | 37 | 0010 0101 | | | x | | | x | | x |
| & | 38 | 0010 0110 | | | x | | | x | x | |
| ' | 39 | 0010 0111 | | | x | | | x | x | x |
| ( | 40 | 0010 1000 | | | x | | x | | | |
| ) | 41 | 0010 1001 | | | x | | x | | | x |
| * | 42 | 0010 1010 | | | x | | x | | x | |
| + | 43 | 0010 1011 | | | x | | x | | x | x |
| , | 44 | 0010 1100 | | | x | | x | x | | |
| - | 45 | 0010 1101 | | | x | | x | x | | x |
| . | 46 | 0010 1110 | | | x | | x | x | x | |
| / | 47 | 0010 1111 | | | x | | x | x | x | x |
| 0 | 48 | 0011 0000 | | x | x | | | | | |
| 1 | 49 | 0011 0001 | | x | x | | | | | x |
| 2 | 50 | 0011 0010 | | x | x | | | | x | |
| 3 | 51 | 0011 0011 | | x | x | | | | x | x |
| 4 | 52 | 0011 0100 | | x | x | | | x | | |
| 5 | 53 | 0011 0101 | | x | x | | | x | | x |
| 6 | 54 | 0011 0110 | | x | x | | | x | x | |
| 7 | 55 | 0011 0111 | | x | x | | | x | x | x |
| 8 | 56 | 0011 1000 | | x | x | | x | | | |
| 9 | 57 | 0011 1001 | | x | x | | x | | | x |
| : | 58 | 0011 1010 | | x | x | | x | | x | |
| ; | 59 | 0011 1011 | | x | x | | x | | x | x |
| < | 60 | 0011 1100 | | x | x | | x | x | | |
| = | 61 | 0011 1101 | | x | x | | x | x | | x |
| > | 62 | 0011 1110 | | x | x | | x | x | x | |
| ? | 63 | 0011 1111 | | x | x | | x | x | x | x |
| @ | 64 | 0100 0000 | x | | | | | | | |
| A | 65 | 0100 0001 | x | | | | | | | x |
| B | 66 | 0100 0010 | x | | | | | | x | |
| C | 67 | 0100 0011 | x | | | | | | x | x |
| D | 68 | 0100 0100 | x | | | | | x | | |
| E | 69 | 0100 0101 | x | | | | | x | | x |
| F | 70 | 0100 0110 | x | | | | | x | x | |
| G | 71 | 0100 0111 | x | | | | | x | x | x |
| H | 72 | 0100 1000 | x | | | | x | | | |
| I | 73 | 0100 1001 | x | | | | x | | | x |
| J | 74 | 0100 1010 | x | | | | x | | x | |
| K | 75 | 0100 1011 | x | | | | x | | x | x |
| L | 76 | 0100 1100 | x | | | | x | x | | |
| M | 77 | 0100 1101 | x | | | | x | x | | x |
| N | 78 | 0100 1110 | x | | | | x | x | x | |
| O | 79 | 0100 1111 | x | | | | x | x | x | x |
| P | 80 | 0101 0000 | x | | x | | | | | |
| Q | 81 | 0101 0001 | x | | x | | | | | x |
| R | 82 | 0101 0010 | x | | x | | | | x | |
| S | 83 | 0101 0011 | x | | x | | | | x | x |
| T | 84 | 0101 0100 | x | | x | | | x | | |
| U | 85 | 0101 0101 | x | | x | | | x | | x |
| V | 86 | 0101 0110 | x | | x | | | x | x | |
| W | 87 | 0101 0111 | x | | x | | | x | x | x |
| X | 88 | 0101 1000 | x | | x | | x | | | |
| Y | 89 | 0101 1001 | x | | x | | x | | | x |
| Z | 90 | 0101 1010 | x | | x | | x | | x | |
| a | 97 | 0110 0001 | x | x | | | | | | x |
| b | 98 | 0110 0010 | x | x | | | | | x | |
| c | 99 | 0110 0011 | x | x | | | | | x | x |
| d | 100 | 0110 0100 | x | x | | | | x | | |
| e | 101 | 0110 0101 | x | x | | | | x | | x |
| f | 102 | 0110 0110 | x | x | | | | x | x | |
| g | 103 | 0110 0111 | x | x | | | | x | x | x |
| h | 104 | 0110 1000 | x | x | | | x | | | |
| i | 105 | 0110 1001 | x | x | | | x | | | x |
| j | 106 | 0110 1010 | x | x | | | x | | x | |

TABLE 1-continued

| Symbol | Numeral base system | | Mixture of Molecules compound | | | | | | | |
|---|---|---|---|---|---|---|---|---|---|---|
| | DEC | Binary | 1 | 2 | 3 | 4 | 5 | 6 | 7 | 8 |
| k | 107 | 0110 1011 | x | x | | x | | | x | x |
| l | 108 | 0110 1100 | x | x | | x | x | | | |
| m | 109 | 0110 1101 | x | x | | x | x | | x | |
| n | 110 | 0110 1110 | x | x | | x | x | x | | |
| o | 111 | 0110 1111 | x | x | | x | x | x | x | |
| p | 112 | 0111 0000 | x | x | x | | | | | |
| q | 113 | 0111 0001 | x | x | x | | | | | x |
| r | 114 | 0111 0010 | x | x | x | | | x | | |
| s | 115 | 0111 0011 | x | x | x | | | | x | x |
| t | 116 | 0111 0100 | x | x | x | | x | | | |
| u | 117 | 0111 0101 | x | x | x | | x | | | x |
| v | 118 | 0111 0110 | x | x | x | | x | x | | |
| w | 119 | 0111 0111 | x | x | x | | x | x | x | |
| x | 120 | 0111 1000 | x | x | x | x | | | | |
| y | 121 | 0111 1001 | x | x | x | x | | | x | |
| z | 122 | 0111 1010 | x | x | x | x | | x | | |

Table 2 lists hex symbols, used for encoding with MolBits 5, 7, 9-13, 16.

TABLE 2

| Symbol | Numeral base system Binary | Mixture of Molecules compound | | | | | | | |
|---|---|---|---|---|---|---|---|---|---|
| | | 9 | 10 | 11 | 12 | 13 | 14 | 5 | 7 |
| | | Rf | | | | | | | |
| | | 0.02 | 024 | 0.44 | 0.79 | 0.01 | 0.26 | 0.45 | 0.81 |
| 0 | 0000 | | | | | x | | | x |
| 1 | 0001 | | | x | x | x | | | x |
| 2 | 0010 | | x | | | | | | |
| 3 | 0011 | | x | x | | | | | x |
| 4 | 0100 | | x | | | | | x | |
| 5 | 0101 | | x | | x | | | x | x |
| 6 | 0110 | | x | x | | | x | | |
| 7 | 0111 | | x | x | x | | x | | x |
| 8 | 1000 | x | | | | | x | x | |
| 9 | 1001 | x | | | x | | x | x | x |
| A | 1010 | x | | x | | x | | | |
| B | 1011 | x | | x | x | x | | | x |
| C | 1100 | x | x | | | x | | x | |
| D | 1101 | x | x | | x | x | | x | x |
| E | 1110 | x | x | x | | | x | x | |
| F | 1111 | x | x | x | x | | x | | x |

Screening of Visualization Methods

Table 3 provides a summary of visualization of MolBits 1-16 with staining solutions. UV irradiation at 254 nm, Iodine ($I_2$), Bromocresol green (BCG), Ninhydrin, and Potassium Permanganate ($KMnO_4$).

TABLE 3

| | Separation | | | | Visualization | | | | |
|---|---|---|---|---|---|---|---|---|---|
| | | MolBits | | | reversible** | | | irreversible | |
| Rf set | Rf | | Compound | Structure | UV | I2 | BCG | Ninhydrin* | KMnO4 |
| I | 0.022 | 1 | 3,4,5-trihydroxybenzoic acid | | x | x | x | | x |
| | 0.048 | 9 | (2-methyl)aminobutane | | | | | x | x |
| | 0.039 | 13 | 4-carboxybenzene sulphonamide | | x | | x | | |
| II | 0.095 | 2 | 4-hydroxybenzioc acid | | x | x | x | | |
| | 0.107 | 14 | 4-hydroxy-m-sulphonamide | | x | | | x | x |
| III | 0.222 | 3 | 4-aminobenzioc acid | | x | | x | x | x |

TABLE 3-continued

| Rf set | Rf | | Compound | Structure | Visualization reversible** | | | irreversible | |
|---|---|---|---|---|---|---|---|---|---|
| | | | MolBits | | UV | I2 | BCG | Ninhydrin* | KMnO4 |
| IV | 0.289 | 4 | 2-hydroxy-5-nitrobenzyl alcohol | | x | x | x | | x |
| | 0.289 | 15 | 3-aminobenzylalcohol | | x | x | | x | x |
| V | 0.35 | 10 | 3-octenoic acid | | | x | x | | x |
| | 0.342 | 16 | 4-ethoxybenzoic acid | | x | x | | | |
| VI | 0.503 | s | 4-ethoxybenzene sulphonamide | | x | | | x | |
| | 0.489 | 11 | citronellic acid | | | x | x | | x |
| VII | 0.578 | 6 | 4-butylbenzene sulphonamide | | x | | | x | |
| VIII | 0.841 | 7 | 2-nitro-benzylalcohol | | x | | | | |
| | 0.853 | 12 | geraniol | | | | x | | x |
| IX | 0.97 | 8 | 2-nitrophenol | | x | x | | | |

*Heating was applied after staining with Ninhydrin.
**UV irradiation after MolBits being stained with I2, and BCG show that all Molbits recover and are therefore classified as non-destructive, whereas staining using Ninhydrin, and KMnO4 show no/partial recovery and are therefore classified as destructive.

Supplementary Demonstrations

Bit modification based on sequential staining. FIG. 7 shows TLC plate (used in FIG. 2C) that was visualized with UV, after it was stained with I2. Binary-to-hex conversion shows that the originally message '8DB0F9CAA' (in UV) changes into '9FF4FFFEE' due to the appearance of additional spots.

Figure 8A:
FIG. 8A-B are exemplary QR codes according to embodiments of the present disclosure.
Figure 8B:
Figure 8C:
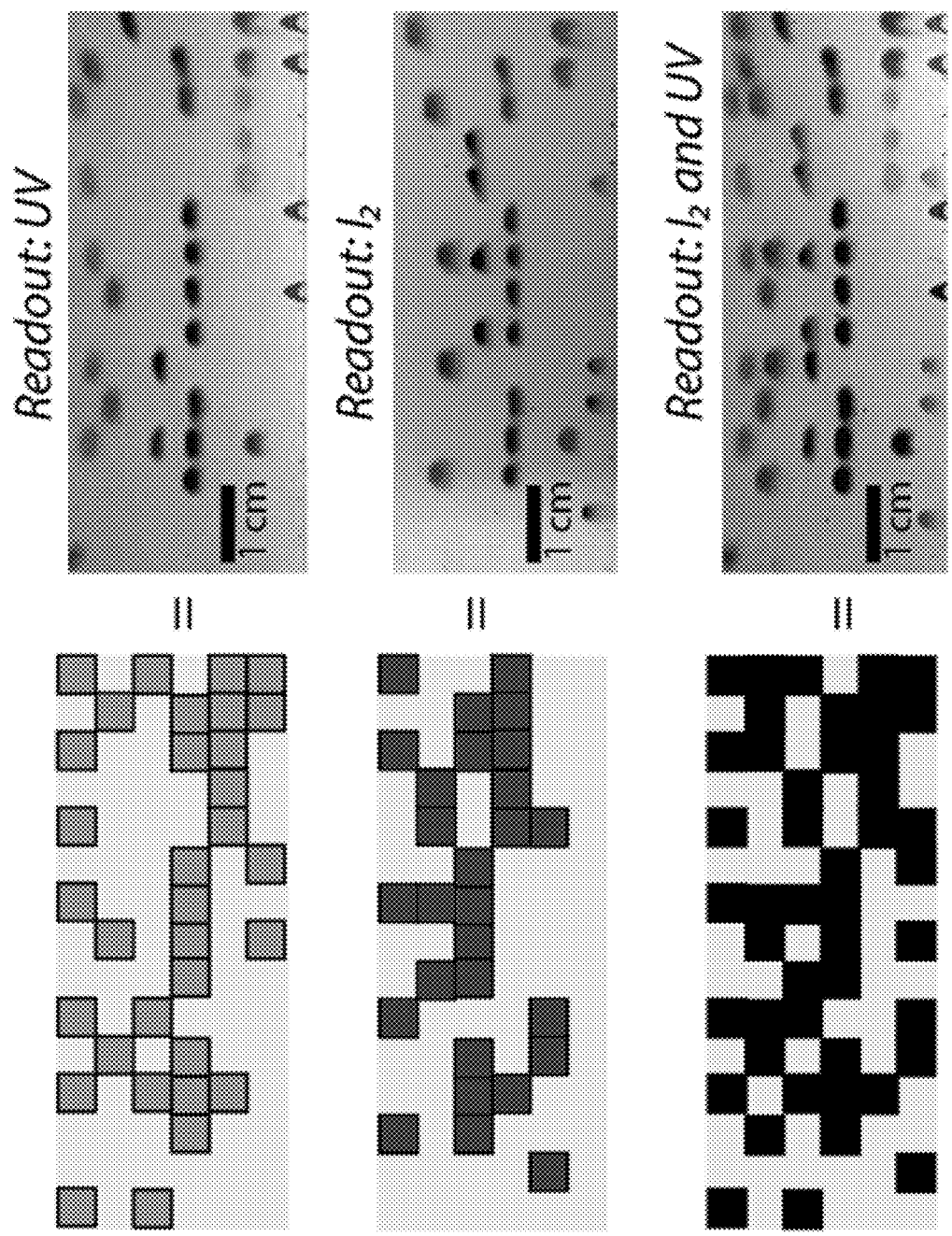
FIG. 8C are images of exemplary Thin-Layer Chromatography (TLC) plates encoding information according to embodiments of the present disclosure.

FIG. 8 shows Pattern substitution in a QR code, using TLC. FIG. 8A shows the mask (in grey) that was used to block the decoding of the information encrypted with a QR code. FIG. 8B shows developed TLC plates visualized using $I_2$, inserted in the QR code. FIG. 8C shows pattern substitution used for the two types of visualization methods (in grey and red, corresponding to UV and $I_2$), and the sum of both methods (in black).

Encoding of patterns using TLC. The patterns depicted in FIG. 8 are encoded in mixtures of MolBits of the set {2, 3, 5, 6, 9-11, 13-15}. We detailed the composition for each lane in Table 3.

Table 4 lists the composition of MolBits for substituting the masked pattern in the QR code in FIG. 3.

TABLE 4

| Rf set | MolBits (Response) | | Lanes | | | | | | | | | | | | | | | |
|---|---|---|---|---|---|---|---|---|---|---|---|---|---|---|---|---|---|---|
| | UV | I2 | 1 | 2 | 3 | 4 | 5 | 6 | 7 | 8 | 9 | 10 | 11 | 12 | 13 | 14 | 15 | 16 |
| VI | 6 | | 6 | | 6 | 6 | | 6 | | | | | 6 | | 6 | | 6 | |
| V | 5 | 11 | | | 11 | | 5 | 11 | | 5 | 11 | | | | 11 | 15 | 11 | |
| IV | 14 | 10 | 14 | | | 14 | | 14 | 10 | | 10 | | 10 | 10 | | | 14 | 10 |
| III | 3 | 3 | | | 3 | 3 | 3 | | 3 | 3 | 3 | 3 | | | 3 | 3 | | 3 |
| II | 15.2 | 2 | | | | 2 | | | | | | | 15 | 15 | 15 | 2 | 2 | |
| I | 13 | 9 | | 9 | | | 9 | 9 | | 13 | | 13 | 9 | | | 13 | 13 | |

*Note:
MolBits 2, and 3 are visualized by both methods.

Figure 9:
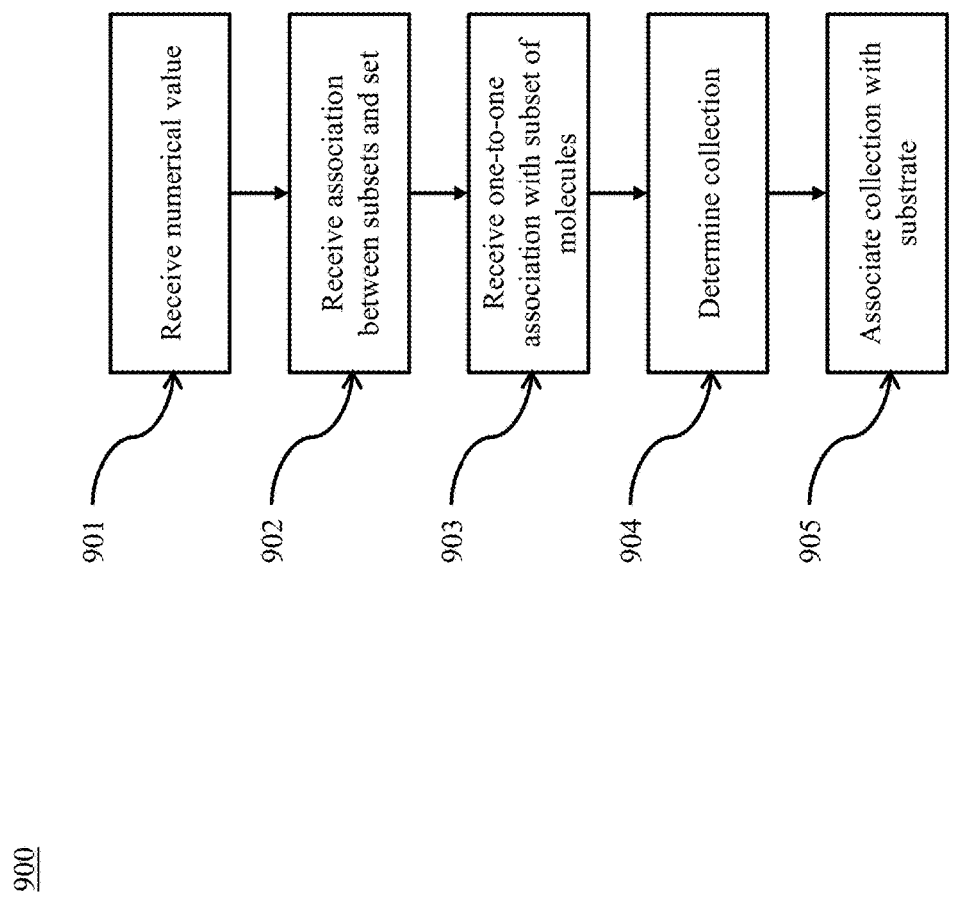
FIG. 9 illustrates a method for writing data to a machine-readable medium is illustrated according to embodiments of the present disclosure.

Referring to FIG. 9, a method for writing data to a machine-readable medium is illustrated according to embodiments of the present disclosure. At 901, a numerical value comprising a set of digit/position pairs is received, the set comprising at least a first subset of digit/position pairs, and a second subset of digit/position pairs. At 902, an association between at least the first and the second subsets of digit/position pairs and the set of digit/position pairs is received. At 903, a one-to-one association between at least the first subset of digit/position pairs and a first subset of molecules, and the second subset of digit/position pairs and a second subset of molecules is received, the first and the second subsets of molecules each selected from a set of unambiguously identifiable molecules, wherein each molecule in the first subset is identifiable by a first physical property, and each molecule in the second subset is identifiable by a second physical property, different from the first physical property. At 904, a collection of molecules corresponding to the numerical value is determined. Determining the collection comprises: determining at least a first subcollection of molecules corresponding to the first subset of digit/position pairs, and a second subcollection of molecules corresponding the second subset of digit/position pairs, and including at least the first and the second subcollections into the collection of molecules. At 905, the molecules of the collection are physically associated with a substrate of the machine-readable medium at an addressable location thereon.

Referring to FIG. 10, a method for reading data from a machine-readable medium is illustrated according to embodiments of the present disclosure. At 1001, an association between a set of digit/position pairs and at least a first and a second subsets of digit/position pairs is received. At 1002, a one-to-one association between at least the first subset of digit/position pairs and a first subset of molecules, and the second subset of digit/position pairs and a second subset of molecules is received, the first and the second subset of molecules selected from a set of unambiguously identifiable molecules, wherein each molecule in the first subset is identifiable by a first physical property, and each molecule in the second subset is identifiable by a second physical property, different from the first physical property. At 1003, a collection of molecules physically associated with a substrate of the machine-readable medium at an addressable location thereon is received, the collection comprising at least a first subcollection of molecules selected from the first subset of molecules, and a second subcollection of molecules, selected from the second subset of molecules. At 1004, a numerical value comprising the set of digit/position pairs from the collection of molecules is determined. Determining the numerical value comprises: setting each position of the first subset of digit/position pairs to the digit whose associated molecule is present in the first subcollection. Each position of the second subset of digit/position pairs is set to the digit whose associated molecule is present in the second subcollection. At 1005, the first and the second subsets of digit/position pairs are combined.

Modifying Information Using Chemical Reactions

Molecular methods that aim to solve simple problems (enhance security or create random access of information stored as MolBits) require the ability to modify specific MolBit(s) in a bit string. Here, the compatibilities of reactions is examined (ordered from low specificity with chemical stains to high specificity with enzymes) with various planar separation methods (ordered from of low resolution in thin layer chromatography, TLC, to high resolution in mass spectrometry, SAMDI). The concepts addressed here—reversible modifying of information using of pairs of opposed reactions, subsetting of information stored in mixtures of molecules—could logically and practically be extended to other existing technologies. Each method could make unique contributions to a new molecular strategy to modify information, in which TLC and SAMDI represents the ends of the spectrum in resolving power.

SAMDI MS: Using Reaction 'Pairs' to Introduce Reversible Changes in a Molecular Property.

Figure 11A:
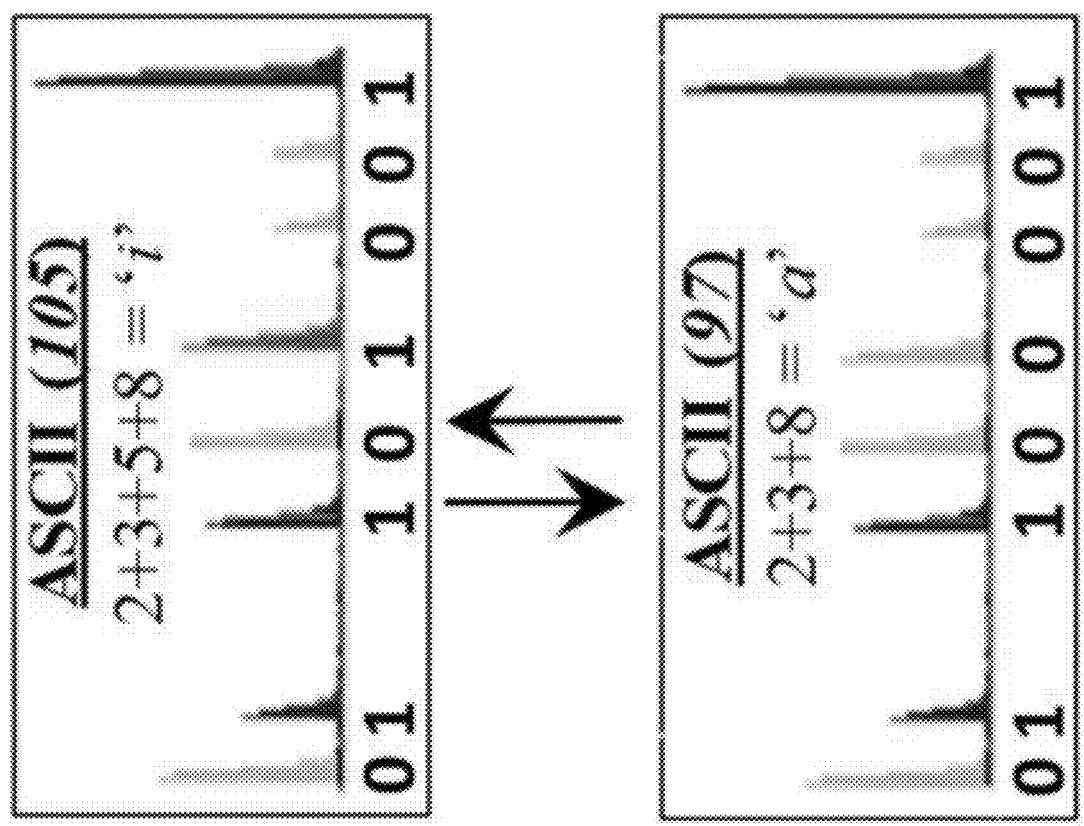
FIG. 11A-C illustrate bit modifications using SAMDI according to embodiments of the present disclosure.
Figure 11B:
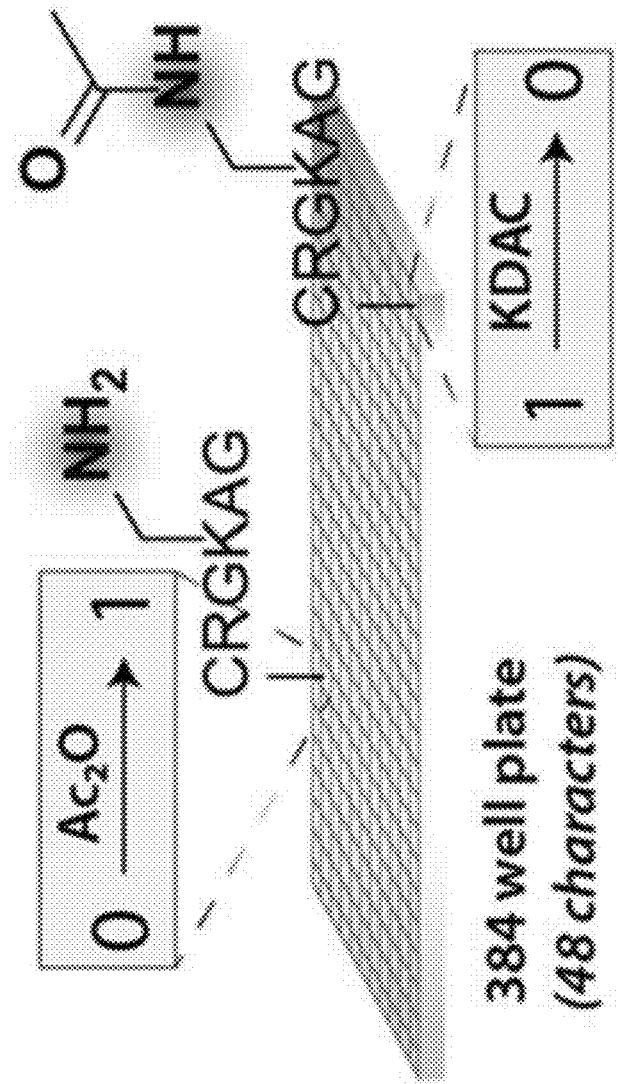

FIG. 11 illustrates bit modifications using SAMDI.

Figure 11C:
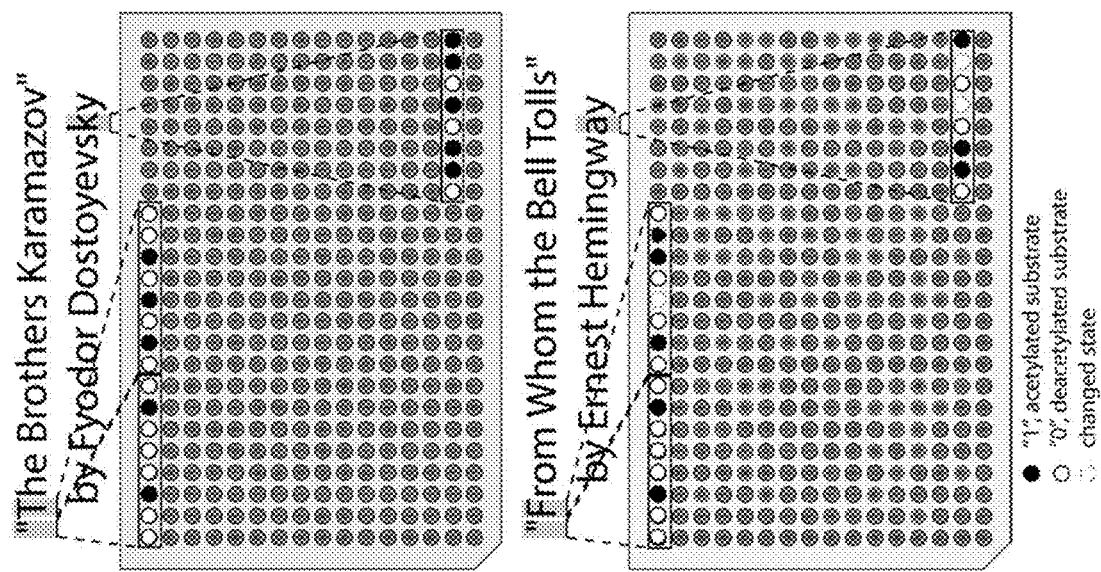

SAMDI allows for selective and reversible modifications of information bits by chemically or enzymatically modifying the reactive side chains of individual oligopeptides. We explored conventional reactions in peptide chemistry, and specific enzymatic reactions to modify the peptides substrates, and thus their masses, to shift the peptides in and out of predefined mass windows. For example, acetylation/deacetylation could form a pair of reactions to change the mass of the MolBit (on a 384 well plate, FIG. 11B), and allow one book title to change into another (FIG. 11C). Briefly, each well contain an oligopeptide CRGKAG, or an acetylated oligopeptide CRGKAcAG. We used acetic anhydride (Ac2O) to acetylate—to add 42 Daltons to the initial mass—and thus change a '0' (presence of a signal from the compound in the pre-determined window) into a '1'.

Inversely, a lysine deacetylases (KDACs) deacetylates (removal of an acetyl-group) to change a '1' into a '0'. Combining this approach with other pairs of reactions would allows for the modification of any information written using these set of peptides to be changed to any other information. Other enzymes or pairs of reactions that can be used are, such as Phosphorylation/Dephosphorylation.

TLC: Using Functional Group Specific Reactions to Filter Molecular Properties.

Figure 12A:
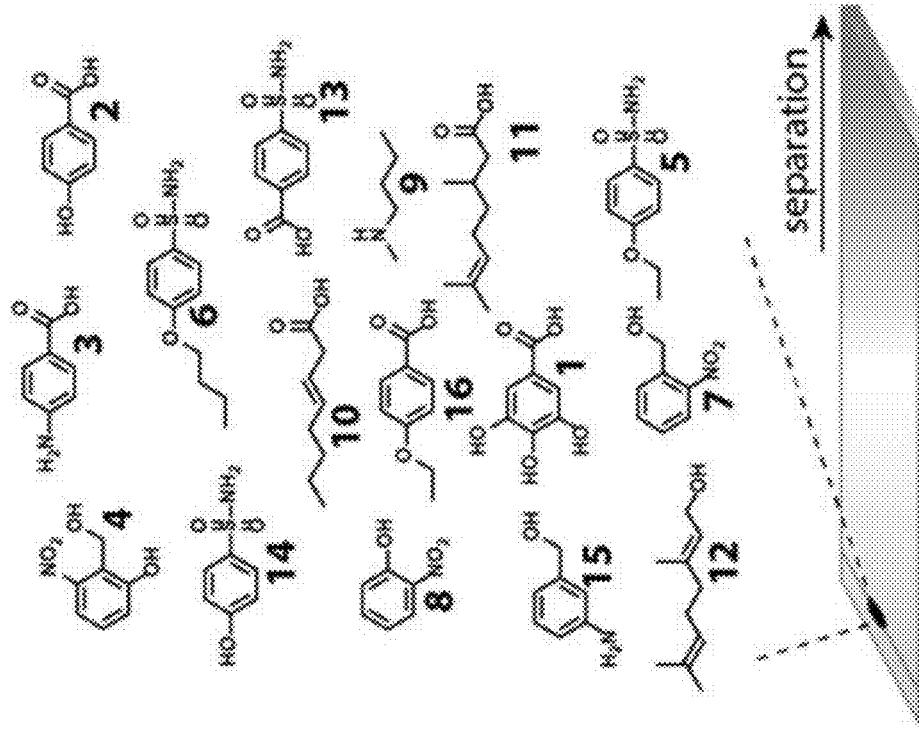
FIG. 12A-C illustrate bit modifications using TLC according to embodiments of the present disclosure.
Figure 12B:
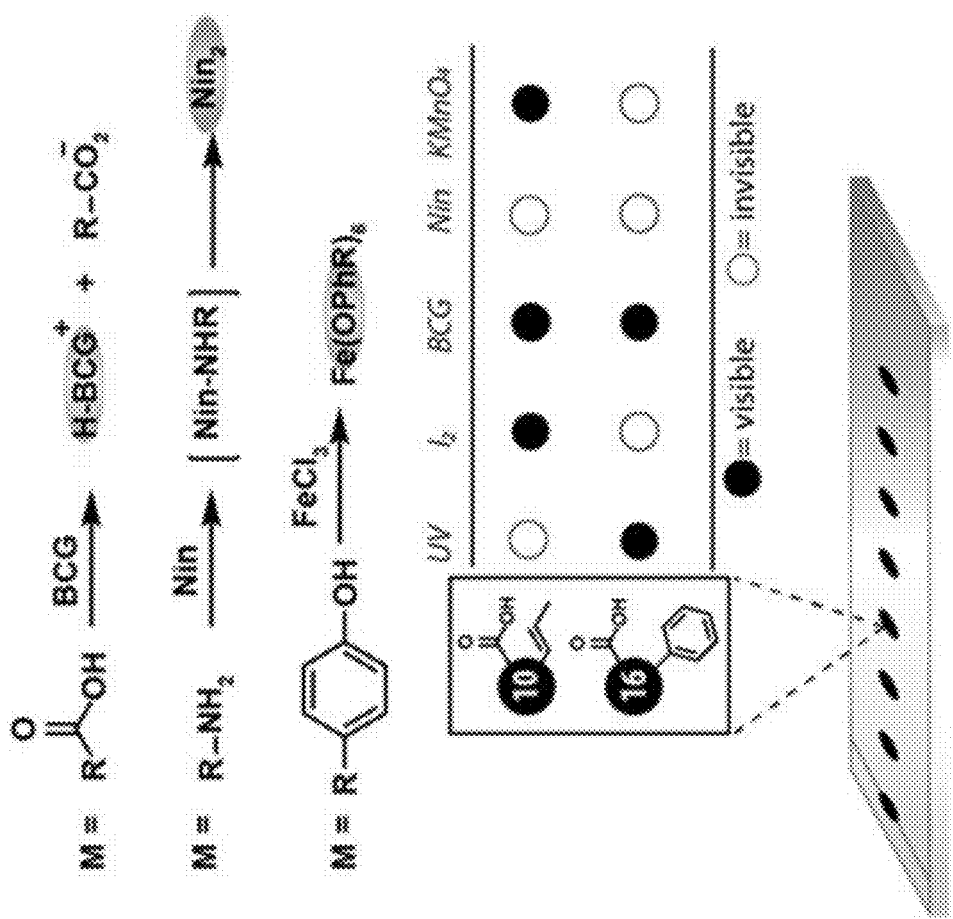
Figure 12C:
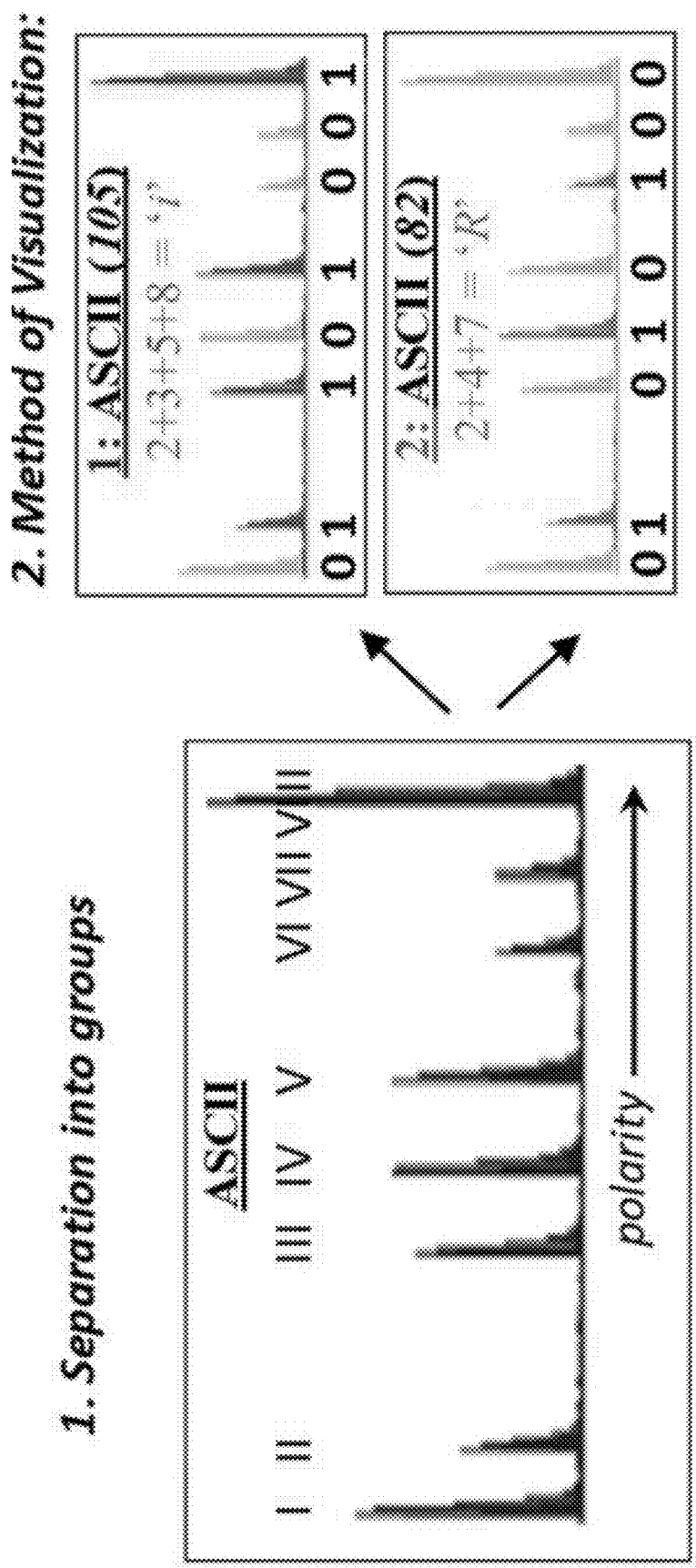

FIG. 12 illustrates bit modifications using TLC. FIG. 12A illustrates encoding information using Thin-Layer Chromatography (TLC). FIG. 12B illustrates decoding information using different visualization techniques.

TLC is a convenient method to separate a relatively small number of molecules on a small plate based on their polarity. It is easily applicable to sets of eight molecules (1 byte), as shown here, or perhaps up to 16 (2 bytes). It is a technique that is inexpensive, simple, requires no power or complex instrumentation, and—importantly—it can use different modes of visualization, e.g., absorbance, fluorescence, or chemical staining. FIG. 12A illustrates the separation process into a set of eight distinguishable groups of molecules (rather than eight distinguishable molecules). Each group (chromatographic spots at predefined retardation factor $R_f$ values) can contain multiple MolBits with differences in their functional groups (but not polarity), that can be addressed by different chemical stains (FIG. 12B), and thus allows visualization methods (e.g., absorbance, or chemical staining reagents) to be used as a 'filter' to modify the read out of the bit strings on the plate (illustrated by FIG. 12C).

In an example of information encoding using TLC, mixtures of MolBits 1-8, were separated on TLC plate which comprises 12 lanes, each indicating one bit string. Among the various possibilities organize MolBits by i) separation, ii) chemical reactivity, is the concept of 'subsetting from mixtures'. We show this concept by encoding messages using mixtures that contain a selection of MolBits 5, 7, 9-13, 16 and decoding them with two different stains (UV, and iodine, 12).

The Functional Role of Reactions in Information Storage and Processing.

Figure 13:
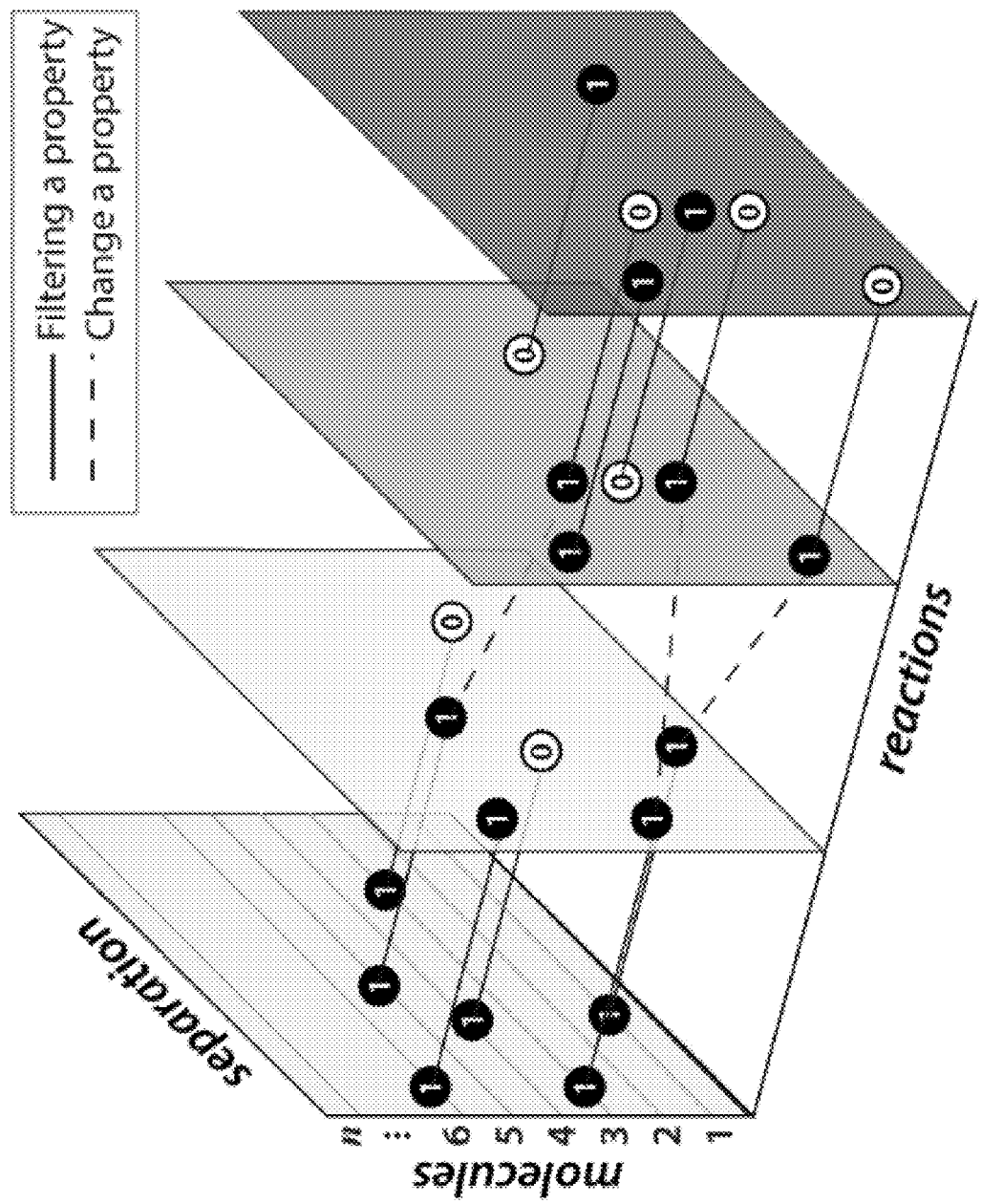
FIG. 13 illustrates layered decoding, using combinations of sequential reactions according to embodiments of the present disclosure.

FIG. 13 illustrates layered decoding, using combinations of sequential reactions.

Reactions change either a molecular property that all MolBits of the mixture possess (e.g., mass, or polarity) or a specific property of that only a few MolBits of the mixture possesses (e.g., functional groups). TLC can be used to reveal short messages (temporarily, or permanently) and provides control over revealing one meaning or another by using chemical stains, whereas SAMDI allows for the reversible modifications of any information using enzymatic reactions. The two approaches differ in the property used for separation (polarity or mass) and the specificity of the subsetting reaction (low specificity with stains, high specificity with enzymes), as well as the accuracy/resolution in detection (retardation factor on a TLC plate, and millidalton resolution in mass spectrometry). The SAMDI-MS approach is superior to the TLC approach in terms of reading speed, writing speed, storage density, and longevity but, however, is not equipped with a number of high-yield selective chemical and enzymatic reactions.

Reactions can be carried out sequentially to creates layers of modifications, and thus layers of encryption. The ability to modify bits can be used (either by changing a property, or filtering of a property) to develop a reaction scheme. The inclusion of reactions in the encoding and decoding of information allows the use of a "lookup-tree" for defining alphanumerical symbols, rather than the use of a lookup table. The advantage of chemical encryption of information lies in the inherent limitations for the number of trials for deciphering, and the difficulties in copying (which typically requires a physical step). A comparative analysis among additional methods allows determination of the number of meaningful combinations that is feasible in the MolBit-reaction matrix, and thus determine the strength of this bit modifications to secure data storage.

Reactions, and Diffusive Controlled Processes

Molecular methods that aim to solve hard problems (such as finding solutions to a puzzle, or optimizing scheduling, packing) must integrate parallel searching of potential solutions in order to compute with efficiency sufficient. Chemical methods based on Reaction-Diffusion processes are used for solving non-polynomial (NP) complete problems. For instance, a gel-stamping system (comprising a storage, substrate and a stamp gel layer) allows for parallel liquid extractions. Importantly, although RD processes are governed by partial differential equations, solutions can be defined by chemical concepts of concentration gradients, solubility, or reaction rates, and thus provide an empirical and easy method to solve hard problems.

Reaction-Diffusion-Based Programming in Hydrogels.

Figure 14A:
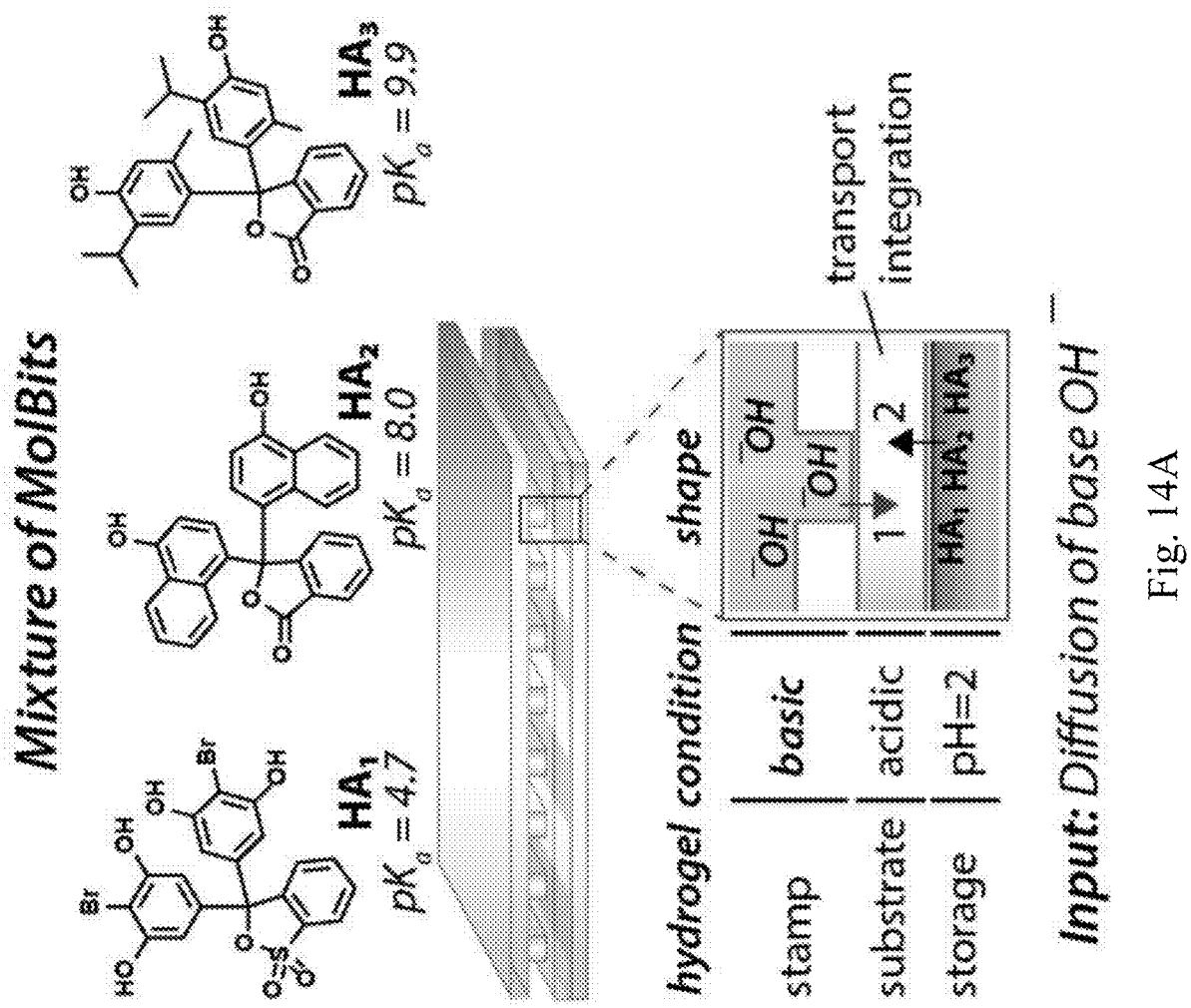

Gel-stamping is a convenient method that use micropatterned agarose gels to control RD. It is a method that enables RD processes in easy-to-fabricate hydrogels, and importantly, parallel processing by imprinting binary, or multilevel architectures into other materials (with features down to 300 nm). FIG. 14A depicts a gel-stamping setup comprising a storage layer, transport layer and a stamp which is used to perform parallelized extraction of a set of acidic dyes (which differ in their acid dissociation constant pKa, ranges from 5-10). Mixtures of these MolBits, imprinted in the storage gel, are immobile because they are poorly soluble in acidic conditions (pH<<pKa) and have limited diffusivity. When the tops of stamp features are brought in contact with a substrate gel (the transport layer), the stamp 'bulk' acts as a one-way chemical pump and causes a downwards diffusion of hydroxide ions (red arrow). The inflow of base ultimately deprotonates the acids at the transport-storage interface and causes an upward diffusion of the conjugated bases into the substrate gel (black arrow).

Figure 14B:
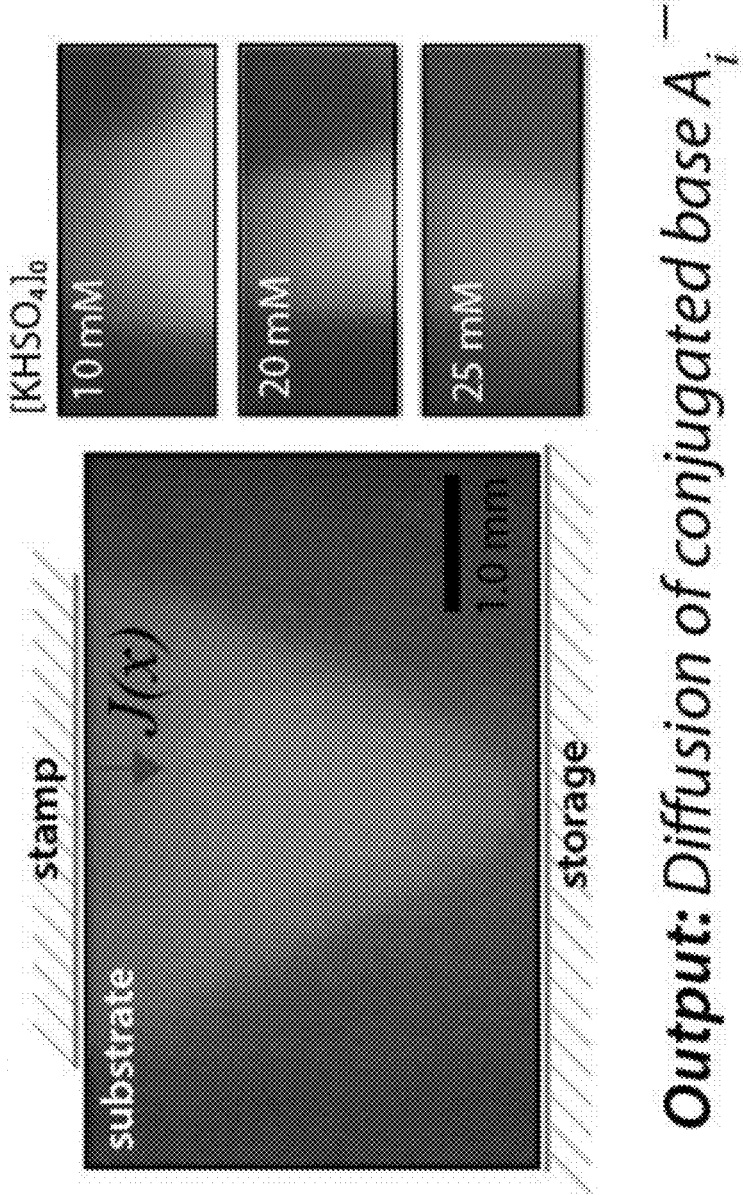

The pattern in the input signal (controlled by the pH's in which the stamp and the substrate were conditioned, and the duration of the contact, FIG. 14B) is thus mapped onto the substrate gel (the output signal). Hence, the substrate represents the "central processing unit": it facilitates the transport of the input signal, it integrates the input with the information that is available in the storage gel (which contains a fixed finite number of internal states, that is as large as the input requires), and it visualizes the output (the yellow grid and the blue pattern, FIG. 14C).

Subsetting Based on Differential Solubility.

Figure 14D:
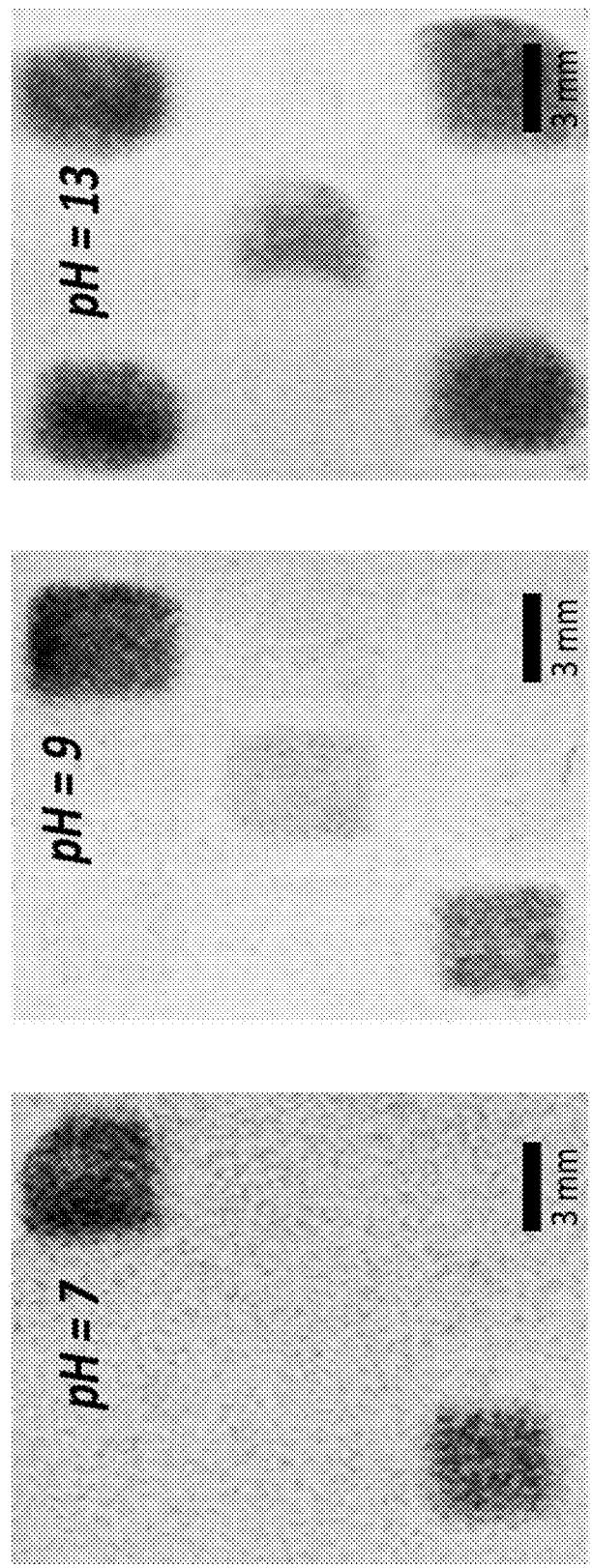

The stamp provide variability in the input pH and allows can be used as a 'filter' to modify the read out of the pattern in the storage layer. FIG. 14D shows a 3×3 grid, in which three different patterns are encoded using the set of MolBits. The use of different input pH's 'selects' the MolBits based on pKa, read by the total concentration of conjuagted base(s). The concept of parallel subsetting based on pKa is thus similar to the approach of subsetting based on changing the detectability of the MolBits but different in the fact that the subset that is selected is dynamic (the input reaction liberates MolBits from the surface). This feature allows for opportunities to integrate molecules that partition in the substrate.

Figure 15:
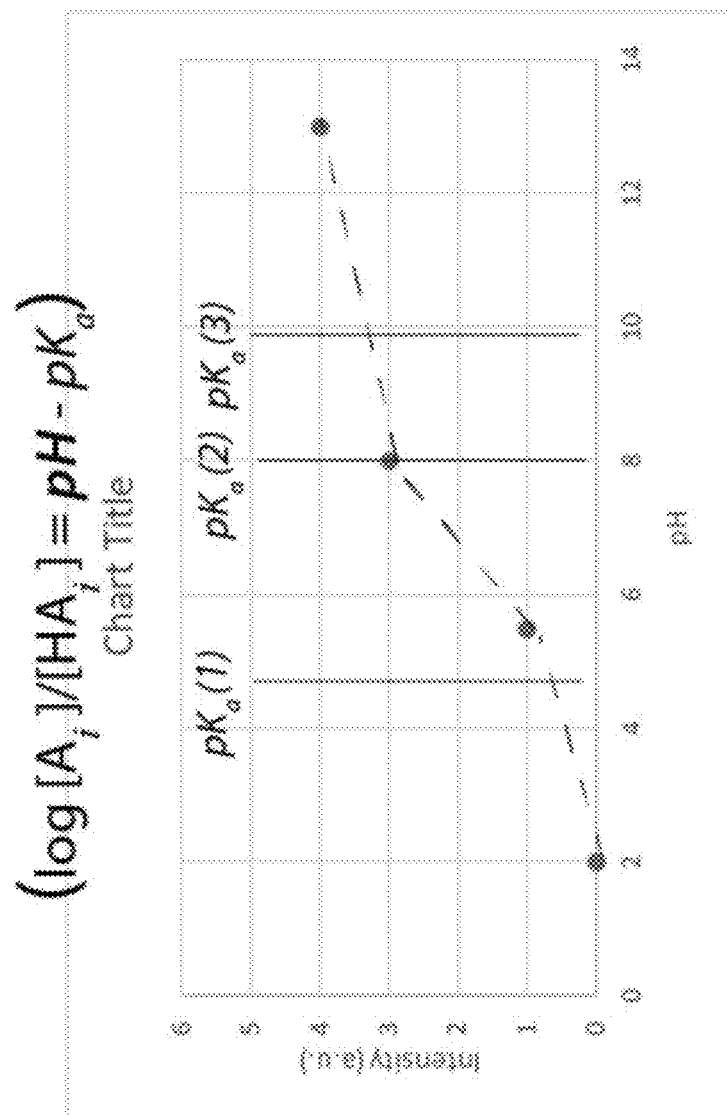
FIG. 15 is a graph of intensity against pH according to embodiments of the present disclosure.

FIG. 15 is a graph of intensity by pH.

Figure 16:
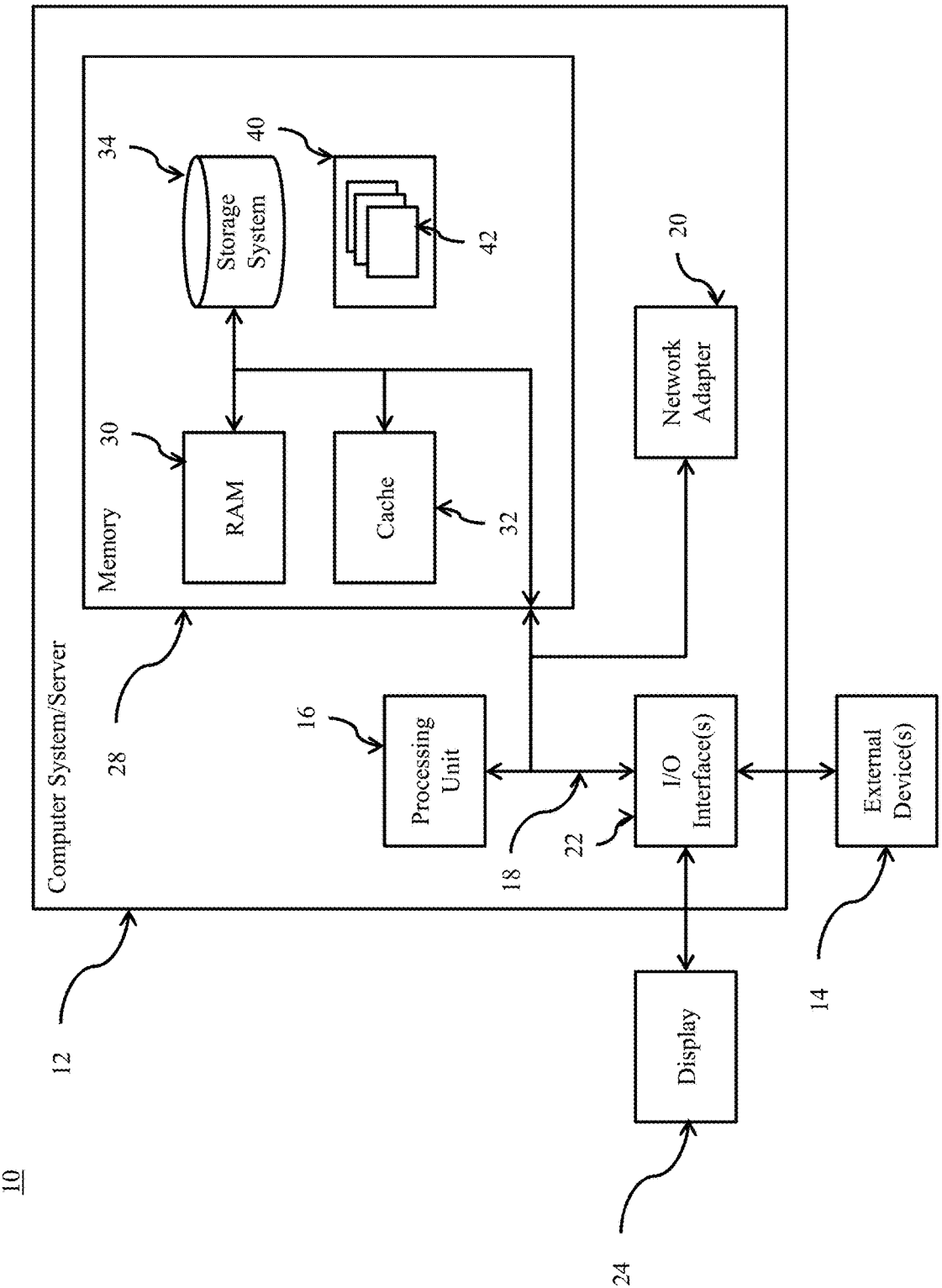
FIG. 16 depicts a computing node according to embodiments of the present disclosure.

Referring now to FIG. 16, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of writing data to a machine-readable medium, the method comprising:
   receiving a numerical value comprising a set of digit/position pairs, the set comprising at least a first subset of digit/position pairs, and a second subset of digit/position pairs;
   receiving an association between at least the first and the second subsets of digit/position pairs and the set of digit/position pairs;
   receiving a one-to-one association between at least the first subset of digit/position pairs and a first subset of molecules, and the second subset of digit/position pairs and a second subset of molecules, the first and the second subsets of molecules each selected from a set of unambiguously identifiable molecules, wherein each molecule in the first subset is identifiable by a first physical property, and each molecule in the second subset is identifiable by a second physical property, different from the first physical property;

determining a collection of molecules corresponding to the numerical value, wherein determining the collection comprises:
 determining at least a first subcollection of molecules corresponding to the first subset of digit/position pairs, and a second subcollection of molecules corresponding the second subset of digit/position pairs, and
 including at least the first and the second subcollections into the collection of molecules; and
physically associating the molecules of the collection with a substrate of the machine-readable medium at an addressable location thereon.

2. A method of reading data from a machine-readable medium, the method comprising:
 receiving an association between a set of digit/position pairs and at least a first and a second subsets of digit/position pairs;
 receiving a one-to-one association between at least the first subset of digit/position pairs and a first subset of molecules, and the second subset of digit/position pairs and a second subset of molecules, the first and the second subset of molecules selected from a set of unambiguously identifiable molecules, wherein each molecule in the first subset is identifiable by a first physical property, and each molecule in the second subset is identifiable by a second physical property, different from the first physical property;
 receiving a collection of molecules physically associated with a substrate of the machine-readable medium at an addressable location thereon, the collection comprising at least a first subcollection of molecules selected from the first subset of molecules, and a second subcollection of molecules, selected from the second subset of molecules;
 determining a numerical value comprising the set of digit/position pairs from the collection of molecules, wherein determining the numerical value comprises:
  setting each position of the first subset of digit/position pairs to the digit whose associated molecule is present in the first subcollection;
  setting each position of the second subset of digit/position pairs to the digit whose associated molecule is present in the second subcollection; and
 combining the first and the second subsets of digit/position pairs.

* * * * *